United States Patent
Ishihara

(10) Patent No.: US 12,326,368 B2
(45) Date of Patent: Jun. 10, 2025

(54) COLORIMETRIC SYSTEM, COLORIMETRIC DEVICE, COLORIMETRIC METHOD, AND NON-TRANSITORY COMPUTER-READABLE STORAGE MEDIUM STORING PROGRAM

(71) Applicant: SEIKO EPSON CORPORATION, Tokyo (JP)

(72) Inventor: Masami Ishihara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 414 days.

(21) Appl. No.: 17/804,024

(22) Filed: May 25, 2022

(65) Prior Publication Data

US 2022/0381616 A1    Dec. 1, 2022

(30) Foreign Application Priority Data

May 28, 2021 (JP) .................... 2021-090109

(51) Int. Cl.
| | | |
|---|---|---|
| *G01J 3/46* | (2006.01) | |
| *G01J 3/50* | (2006.01) | |
| *G06F 3/14* | (2006.01) | |

(52) U.S. Cl.
CPC . *G01J 3/50* (2013.01); *G06F 3/14* (2013.01)

(58) Field of Classification Search
CPC ..... G01J 3/501; G01J 3/52; G01J 3/46; G06F 3/14
USPC .......... 358/504, 518, 538, 2.1; 382/313, 164
See application file for complete search history.

(56) References Cited

U.S. PATENT DOCUMENTS

| | | | |
|---|---|---|---|
| 7,385,701 B2 | 6/2008 | Watanabe et al. | |
| 9,986,134 B2 | 5/2018 | Sugita | |
| 2006/0109458 A1 | 5/2006 | Watanabe et al. | |
| 2007/0153340 A1* | 7/2007 | Itagaki | G03G 15/01 358/518 |
| 2009/0296118 A1 | 12/2009 | Tsukamoto | |
| 2009/0316234 A1 | 12/2009 | Yamamoto | |
| 2013/0050784 A1* | 2/2013 | Yamamoto | H04N 1/6033 358/505 |
| 2017/0118382 A1 | 4/2017 | Sugita et al. | |
| 2018/0352202 A1 | 12/2018 | Yu et al. | |
| 2020/0070539 A1* | 3/2020 | Kobayashi | B41J 2/2103 |

FOREIGN PATENT DOCUMENTS

| | | |
|---|---|---|
| JP | 2001-080052 | 3/2001 |
| JP | 2005-061926 A | 3/2005 |
| JP | 2006-153498 | 6/2006 |
| JP | 2008182691 A * | 8/2008 |

(Continued)

*Primary Examiner* — Jamares Q Washington
(74) *Attorney, Agent, or Firm* — WORKMAN NYDEGGER

(57) ABSTRACT

A colorimetric system includes: a communication section that receives the color value of a color for which colorimetry has been performed by a colorimetric device that performs colorimetry; and a comparison processing section that performs comparison processing between the received color value and the color value of a reference color. The comparison processing section decides whether a line colorimetry error occurred on a line under colorimetry. When the comparison processing section decides that a line colorimetry error occurred, the communication section transmits information about the line colorimetry error to the colorimetric device.

13 Claims, 19 Drawing Sheets

(56) References Cited

FOREIGN PATENT DOCUMENTS

| | | |
|---|---|---|
| JP | 2009-288027 | 12/2009 |
| JP | 2011-141253 | 7/2011 |
| JP | 2012205221 A * | 10/2012 |
| JP | 2017-078990 | 4/2017 |
| JP | 2019-190984 | 10/2019 |

* cited by examiner

FIG. 13
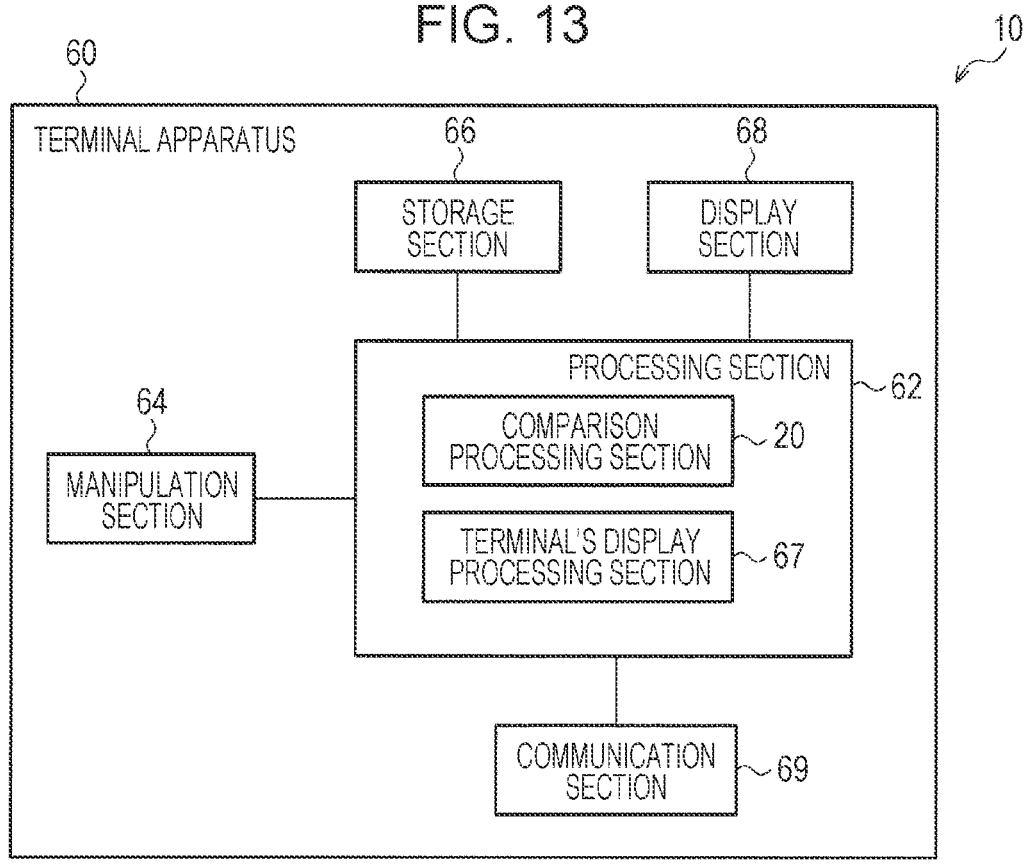
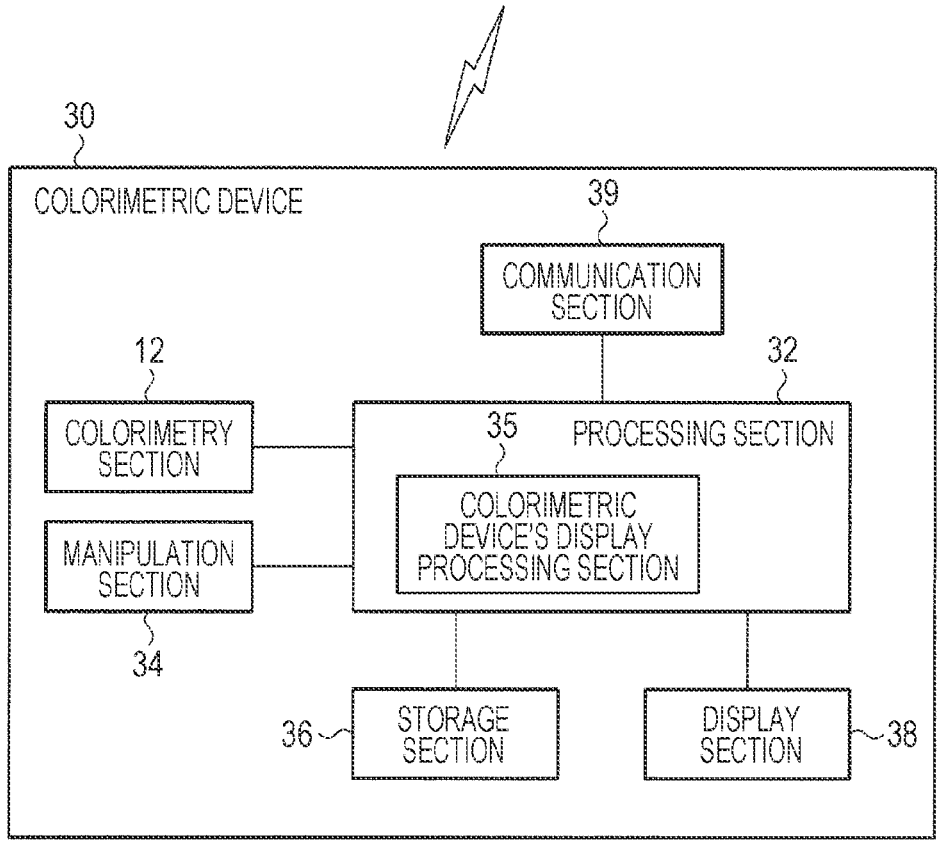

| MEASURED LINE | | FIRST LINE | SECOND LINE | THIRD LINE |
|---|---|---|---|---|
| MEASUREMENT RESULTS (ΔE) | A | 0.3 | 80.5 | 120.8 |
| | B | 0.5 | 93.5 | 0.5 |
| | C | 0.3 | 102.5 | 107.7 |
| | D | 0.3 | 120.9 | 0.7 |
| | E | 0.2 | 99.7 | 0.7 |
| | F | 0.4 | 93.6 | 98.9 |
| | G | 0.1 | 104.6 | 0.6 |
| | H | 0.3 | 96.7 | 94.1 |
| Ave ΔE | | 0.3 | 99 | 53 |
| SECOND CRITERION | | OK | NG | NG |

NG IN ACCORDANCE WITH FIRST CRITERION

COLORIMETRIC SYSTEM, COLORIMETRIC DEVICE, COLORIMETRIC METHOD, AND NON-TRANSITORY COMPUTER-READABLE STORAGE MEDIUM STORING PROGRAM

The present application is based on, and claims priority from JP Application Serial Number 2021-090109, filed May 28, 2021, the disclosure of which is hereby incorporated by reference herein in its entirety.

BACKGROUND

1. Technical Field

The present disclosure relates to a colorimetric system, a colorimetric device, a colorimetric method, a non-transitory computer-readable storage medium storing a program, and the like.

2. Related Art

A colorimetric device known in related art performs colorimetry for color patches such as color test patterns intended for a printing apparatus. In a technology disclosed in JP-A-2005-061926, the user performs colorimetry for a target line of color patches and determines whether there is a match between the number of colorimetric data items and the number of color patches. When there is no match, the user is notified that the colorimetric data is invalid.

However, a system is not proposed that makes a notification indicating whether the user has performed colorimetry for a correct line of color patches. In the technology described in JP-A-2005-061926, this situation is not considered.

SUMMARY

An aspect of the present disclosure relates to a colorimetric system that includes: a communication section that receives the color value of a color for which colorimetry was performed by a colorimetric device that performs colorimetry; and a comparison processing section that performs comparison processing between the received color value and the color value of a reference color. The comparison processing section decides whether a line colorimetry error occurred on a line under colorimetry. When the comparison processing section decides that the line colorimetry error occurred, communication section transmits information about the line colorimetry error to the colorimetric device.

Another aspect of the present disclosure relates to a colorimetric device that includes: a comparison processing section that performs comparison processing between the color value of a reference color and the color value of a color for which colorimetry was performed by a colorimetry section that performs colorimetry; and a display processing section. The comparison processing section decides whether a line colorimetry error occurred on a line under colorimetry. When the comparison processing section decides that the line colorimetry error occurred, the display processing section performs processing for displaying information about the line colorimetry error.

Yet another aspect of the present disclosure relates to a colorimetric method comprising: receiving the color value of a color for which colorimetry was performed by a colorimetric device that performs colorimetry; performing comparison processing between the received color value and the color value of a reference color; deciding whether a line colorimetry error occurred on a line under colorimetry; and transmitting, when the occurrence of the line colorimetry error is decided, information about the line colorimetry error to the colorimetric device.

Still another aspect of the present disclosure relates to a non-transitory computer-readable storage medium storing a program that causes a colorimetric system to execute: a step of receiving the color value of a color for which colorimetry was performed by a colorimetric device that performs colorimetry; a step of performing comparison processing between the received color value and the color value of a reference color; a step of deciding whether a line colorimetry error occurred on a line under colorimetry; and a step of transmitting, when the occurrence of the line colorimetry error is decided, information about the line colorimetry error to the colorimetric device.

BRIEF DESCRIPTION OF THE DRAWINGS

FIG. 13 is a block diagram illustrating an example of the structure of the colorimetric system including the colorimetric device and terminal apparatus.

DESCRIPTION OF EXEMPLARY EMBODIMENTS

An embodiment of the present disclosure will be described below. The embodiment described below does not unreasonably restrict the contents of the present disclosure, the contents being described in the scope of claims. All of the structures described in the embodiment are not always essential structural requirements in the present disclosure.

Figure 1:
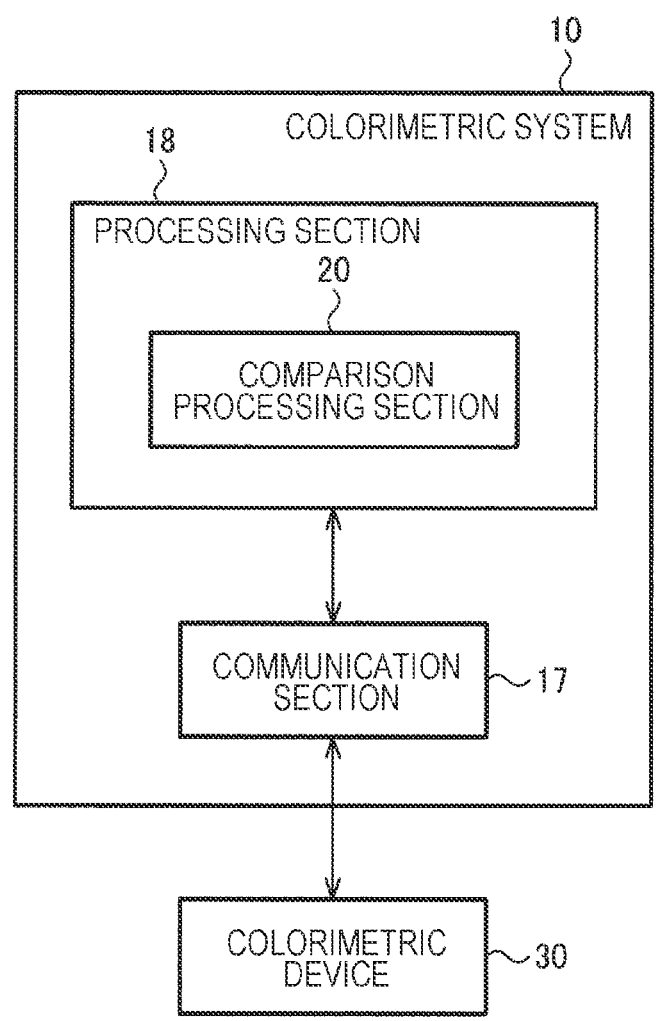
FIG. 1 is a block diagram illustrating an example of the structure of a colorimetric system.

FIG. 1 is a block diagram illustrating an example of the structure of a colorimetric system 10 in this embodiment. The colorimetric system 10 in this embodiment includes a communication section 17 and a processing section 18. The processing section 18 includes a comparison processing section 20. The colorimetric system 10 can communicate with a colorimetric device 30 through the communication section 17. The colorimetric system 10 may be implemented by, for example, a terminal apparatus 60, which will be described later, or by cloud computing or the like. The colorimetric system 10 can be implemented in any of various forms.

Figure 3:
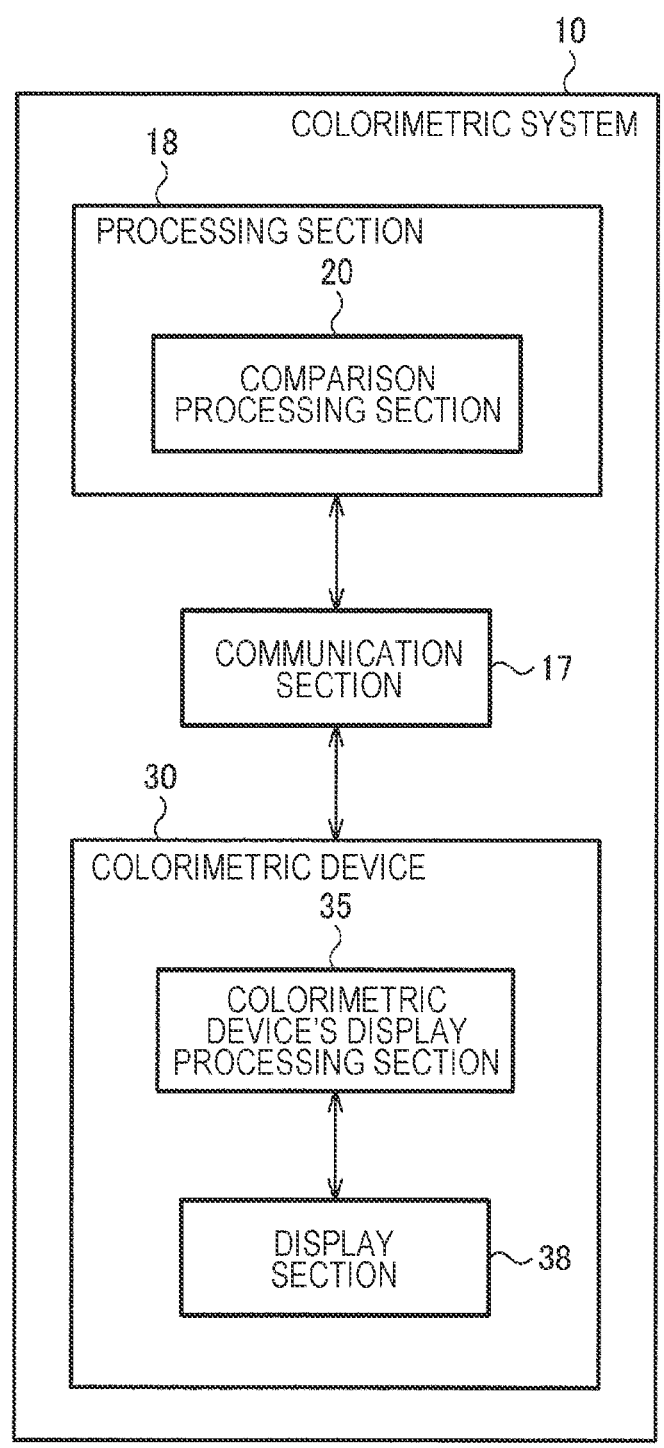
FIG. 3 is a block diagram illustrating another example of the structure of the colorimetric system.

The colorimetric device 30 performs colorimetry. The colorimetric device 30 can perform colorimetry by including a colorimetry section 12 in FIG. 5, the colorimetry section 12 being omitted in, for example, FIGS. 1 and 3. The colorimetry section 12 performs colorimetry for a target color, which is, for example, printed on a print medium, and then outputs a color value, which is a colorimetry result. The colorimetry section 12 can be implemented by a colorimetric sensor or the like. A spectroscopic sensor, for example, can be used as the colorimetric sensor. For example, as the colorimetric sensor, a spectroscopic sensor implemented by a micro-electromechanical systems (MEMS) device, which can be produced in batch in a wafer-level process, or the like can be used. The spectroscopic sensor is, for example, a type of a sensor that measures a reflection spectroscopic spectrum. Specifically, the spectroscopic sensor can be implemented by a power source implemented by, for example, a light-emitting diode (LED), an optic filter that receives reflected light, which is light emitted from the light source and is then reflected on a measurement surface, and then selects or switches a waveform, a photosensitive device that measures the amount of reflected light that has passed through the optical filter, and other components. As the spectroscopic sensor, an etalon, for example, can be used, the etalon being a wavelength filter that uses multiple interference on two opposing reflection surfaces. Since the spectroscopic sensor is used to measure a reflection spectroscopic spectrum from which the amount of reflected light is measured for each waveform of the reflected light, colorimetry can be performed for the target color. The colorimetric sensor that implements the colorimetry section 12 is not limited to this type of spectroscopic sensor. For example, the colorimetric sensor may be implemented by an image sensor. As the colorimetry section 12, a colorimetric sensor that performs colorimetry not only for reflected light but also for transmitted light may be used.

The communication section 17 is a communication interface that performs wireless or wired communication with the colorimetric device 30 or another external device. The communication section 17 can be implemented by, for example, firmware for use in communication and hardware such as a processor for use in communication or an application-specific integrated circuit (ASIC) for use in communication. To communicate with the external device, the communication section 17 uses, for example, near field communication based on Bluetooth (registered trademark). Specifically, the communication section 17 communicates with the external device by wireless communication complying with the Bluetooth Low Energy (BLE) standard. Alternatively, the communication section 17 may communicate with the external device by wireless communication complying with another standard such as Wireless Fidelity (Wi-Fi) (registered trademark) or by wired communication complying with the Universal Serial Bus (USB) or another standard. The communication section 17 in this embodiment receives the color value of a color for which colorimetry was performed by the colorimetric device 30. Specifically, although not illustrated in FIGS. 1, 3, and 10, the colorimetric device 30 can be coupled to the communication section 17 so as to communicate with it by, for example, including a communication section 39, which will be described later with reference to, for example, FIG. 13, enabling the communication section 17 to receive the color value described above. When the colorimetric system 10 is implemented by the terminal apparatus 60, which will be described later, the communication section 17 is equivalent to a communication section 69, which will be described later.

The processing section 18 controls individual sections in the colorimetric system 10. The processing section 18 can be implemented by, for example, a processor in a processing section 62 in the terminal apparatus 60, as will be described later in detail. The processing section 18 performs processing in this embodiment according to a program in this embodiment. This program causes a computer to function as individual sections in this embodiment. The computer is, for example, an apparatus having a manipulation section, a processing section, a storage section, and an output section. The program in this embodiment is, for example, a type of program that causes, as the comparison processing section 20, the computer to function. The program is stored in, for example, an information storage medium. That is, the colorimetric system 10 in this embodiment can perform processing in this embodiment according to the program stored in the information storage medium. The information storage medium, which is a computer-readable medium, stores the program and data. The functions of the information storage medium can be implemented by an optical disk, a hard disk drive (HDD), a semiconductor memory, or the like.

The comparison processing section 20 performs comparison processing between the received color value and the color value of a reference color. For a first color to an n-th color (n is an integer greater than or equal to 2), for example, the comparison processing section 20 compares a color for which colorimetry has been performed with a color eligible for comparison, and decides whether there is a match between them. A match between the color for which colorimetry has been performed and the color eligible for comparison indicates that a tolerance condition for a color match is satisfied. The tolerance condition can be set in any of various forms. For example, when the color difference $\Delta E$ between the color for which colorimetry has been performed and the color eligible for comparison is smaller than a predetermined value, the comparison processing section 20 decides that there is a match between the color for which colorimetry has been performed and the color eligible for comparison. The tolerance condition may be another condition for the color difference $\Delta E$, a condition for a light source in the environment, a condition for each color component, or a condition for a reflection spectroscopic spectrum. Alternatively, the tolerance condition may be a combination of these conditions. Comparison processing may be performed in a spot colorimetry mode in which colorimetry is performed once at a time on a per-spot basis. Alternatively, when a plurality of colors for which to perform colorimetry are arranged in a line, comparison processing may be performed in a line colorimetry mode in which colorimetry is performed for a plurality of colors at one time on a per-line basis. In the description below, colorimetry in the line colorimetry mode may also be referred to as line colorimetry. Line colorimetry may also be scan colorimetry. In line colorimetry, n colors eligible for comparison are needed. Here, a set of n colors eligible for comparison is referred to as a color group.

The comparison processing section 20 also decides whether a line colorimetry error has occurred on a line under colorimetry. The line colorimetry error indicates that the line for which the user has actually performed line colorimetry does not match the true line targeted for colorimetry. For a desired line in a target for colorimetry, for example, it will be assumed that the user performed colorimetry in line colorimetry. Then, the comparison processing section 20 decides whether there is a match between the true line that the user defined as the target for colorimetry and the line for which the user has actually performed colorimetry, from colorimetry results in colorimetry performed for the first to n-th colors (n is an integer greater than or equal to 2) included in the true line, according to a predetermined criterion. The predetermined criterion is, for example, a first criterion, which will be described later with reference to FIG. 20. However, the user can appropriately determine the predetermined criterion.

Figure 2:
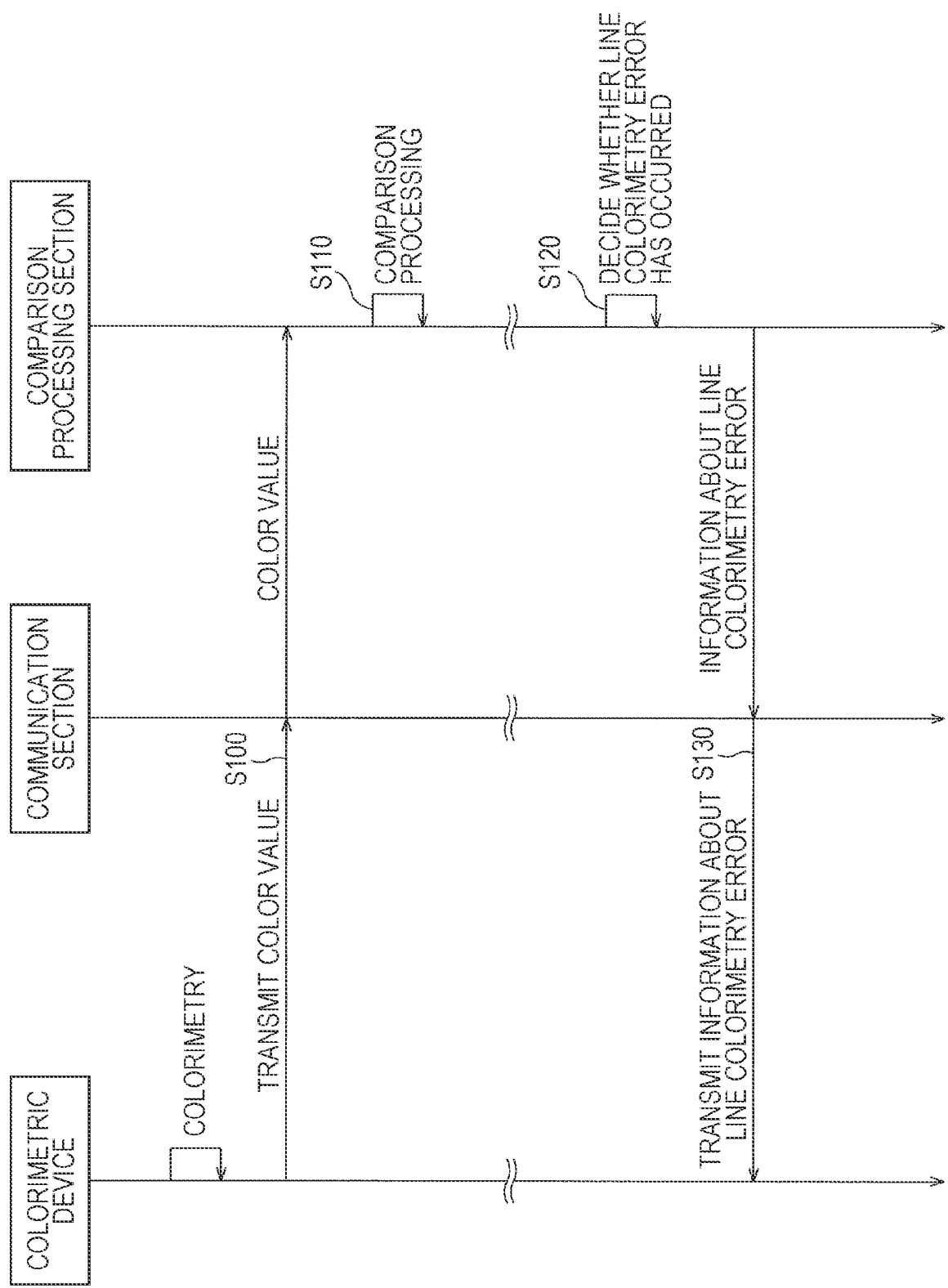
FIG. 2 illustrates a flow of processing in the colorimetric system.

FIG. 2 illustrates a flow of processing in the colorimetric system 10 in this embodiment. The colorimetric device 30 performs colorimetry and transmits a color value to the communication section 17 (step S100). Specifically, the communication section 39 in the colorimetric device 30 transmits a color value to the communication section 17 in the colorimetric system 10. The comparison processing section 20 receives the color value through the communication section 17 and performs comparison processing described above (step S110). The comparison processing section 20 repeatedly performs comparison processing as many times as the number of colors included in one line (step S110), after which the comparison processing section 20 decides whether a line colorimetry error has occurred (step S120). When the comparison processing section 20 decides that a line colorimetry error has occurred, the comparison processing section 20 transmits information about the line colorimetry error to the colorimetric device 30 through the communication section 17 (step S130). In other words, when the comparison processing section 20 decides that a line colorimetry error has occurred, the communication section 17 transmits information about the line colorimetry error to the colorimetric device 30.

As described above, the colorimetric system 10 in this embodiment includes the communication section 17 that receives the color value of a color for which colorimetry has been performed by the colorimetric device 30 that performs colorimetry, as well as the comparison processing section 20 that performs comparison processing between the received color value and the color value of the reference color. The comparison processing section 20 decides whether a line colorimetry error has occurred on a line under colorimetry. When the comparison processing section 20 decides that a line colorimetry error has occurred, the communication section 17 transmits information about the line colorimetry error to the colorimetric device 30. Thus, by including the communication section 17 and comparison processing section 20, the colorimetric system 10 in this embodiment can compare the color value of the color for which colorimetry has been performed by the colorimetric device 30 with the color value of the reference color. The user must not only perform colorimetry with a positional relationship determined between the colorimetric device 30 and the line under colorimetry but also confirm the result in the colorimetry. However, the user's attention may be focused only on performing colorimetry. Therefore, when colorimetry is in progress for a line different from the true line eligible for colorimetry, the later the user recognizes the fact, the greater the amount of work needed to perform colorimetry again is. However, when the technique in this embodiment is applied, it is possible for the colorimetric system 10 separate from the colorimetric device 30 to notify the user at earlier time that colorimetry is in progress for the wrong line. Therefore, the amount of work needed to perform colorimetry again can be minimized, enabling the user to smoothly perform colorimetry. For example, a predetermined lamp or the like may be provided on the colorimetric device 30. When a line colorimetry error occurs, the lamp may be turned on to notify the user of the line colorimetry error.

Alternatively, the colorimetric device 30 may generate a predetermined alarm sound to notify the user of the line colorimetry error. This enables the user who handles the colorimetric device 30 to recognize a line colorimetry error at early time.

The technique in this embodiment may also be implemented as a colorimetric method. Specifically, in the colorimetric method in this method, the color value of a color for which colorimetry has been performed by the colorimetric device 30 that performs colorimetry is received; comparison processing is performed between the received color value and the color value of a reference color; it is decided whether a line colorimetry error has occurred on a line under colorimetry; and when it is decided that a line colorimetry error has occurred, information about the line colorimetry error is transmitted to the colorimetric device 30. Thus, an effect similar to the above effect can be obtained.

The technique in this embodiment may also be implemented as a non-transitory computer-readable storage medium storing a program. Specifically, the program in this embodiment causes the colorimetric system 10 to execute a step of receiving the color value of a color for which colorimetry has been performed by the colorimetric device 30 that performs colorimetry, a step of executing comparison processing between the received color value and the color value of a reference color, a step of deciding whether a line colorimetry error has occurred on a line under colorimetry, and a step of transmitting, when it is decided that a line colorimetry error has occurred, information about the line colorimetry error to the colorimetric device 30. Thus, an effect similar to the above effect can be obtained.

The colorimetric system 10 in this embodiment is not limited to the above description. The colorimetric system 10 can be practiced as any of various variations by, for example, adding other constituent elements. For example, the colorimetric system 10 may have an exemplary structure in which the colorimetric system 10 further includes the colorimetric device 30 and the colorimetric device 30 further includes a colorimetric device's display processing section 35, as illustrated in the block diagram in FIG. 3. The colorimetric device 30 can further include a display section 38.

The colorimetric device's display processing section 35 performs processing for displaying information about a line colorimetry error. Although not illustrated in FIG. 3, the colorimetric device's display processing section 35 is included in, for example, a processing section 32 in FIG. 5 and can be implemented by hardware in the processing section 32. The colorimetric device's display processing section 35 displays, on the display section 38, an image based on information about a line colorimetry error transmitted from the communication section 17. The display section 38 will be described later with reference to FIG. 13. Examples of an image based on information about a line colorimetry error include an image indicating that a line colorimetry error has occurred and an image that prompts re-execution of line colorimetry. As described above, the colorimetric system 10 in this embodiment includes the colorimetric device 30 and the colorimetric device 30 includes the colorimetric device's display processing section 35 that performs processing for displaying information about a line colorimetry error. Thus, information about a line colorimetry error can be displayed on the display section 38 of the colorimetric device 30. This enables the user who handles the colorimetric device 30 to recognize, on the display section 38, that the line under colorimetry is wrong.

Figure 4:
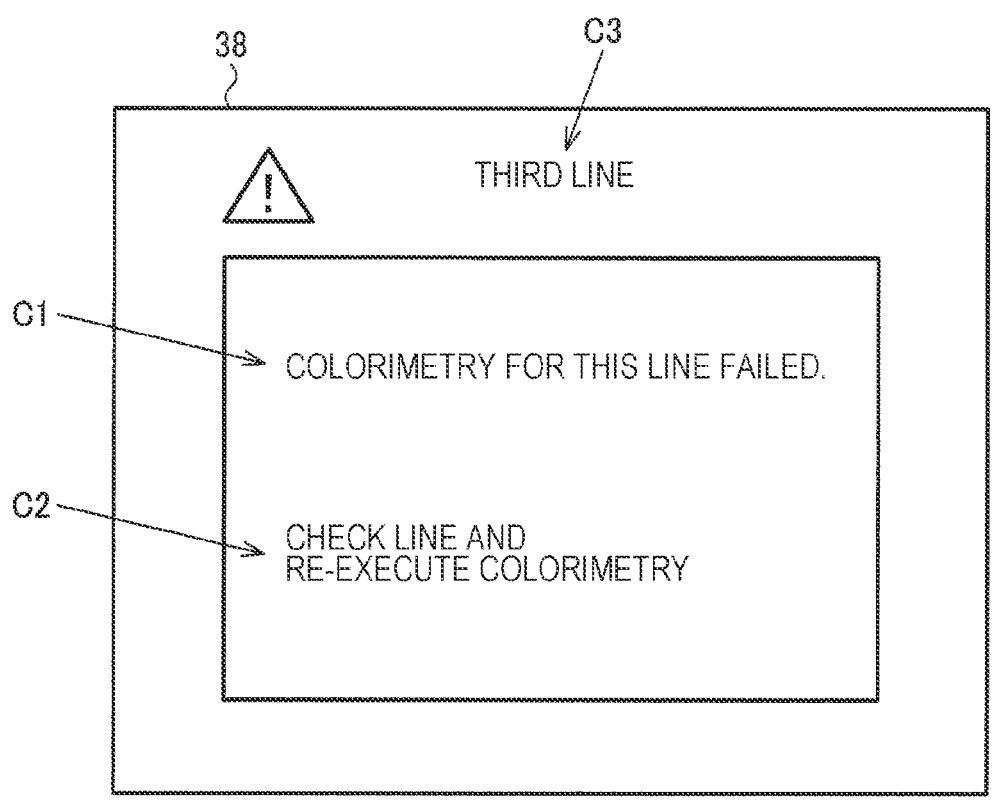
FIG. 4 illustrates an example of a screen showing a display of a line colorimetry error.

FIG. 4 illustrates an example of a screen showing a line colorimetry error, the screen being displayed on the display section 38. For example, the colorimetric device's display processing section 35 displays, on the display section 38, information indicating that a line colorimetry error has occurred, as indicated by C1. The colorimetric device's display processing section 35 also displays, on the display section 38, information that prompts re-execution of line colorimetry, as indicated by C2. The colorimetric device's display processing section 35 also displays information indicating the line, in the color chart, on which the line colorimetry error has occurred, as indicated by C3. The color chart usually includes numerals or the like that identify lines. From information indicated by C3, therefore, the user can recognize the line, in the color chart, on which a line colorimetry error has occurred, as will be described later with reference to FIG. 19. As described above, in the colorimetric system 10 in this embodiment, the colorimetric device's display processing section 35 performs processing for displaying a prompt to re-execute colorimetry for a line, under colorimetry, on which a line colorimetry error has occurred. When a prompt to re-execute colorimetry is not displayed, for example, the user may decide that the cause of the error is a poor printout of the target for colorimetry. When the technique in this embodiment is applied, however, the user can reliably recognize that the wrong line has been selected as the line for which to perform colorimetry.

Figure 5:
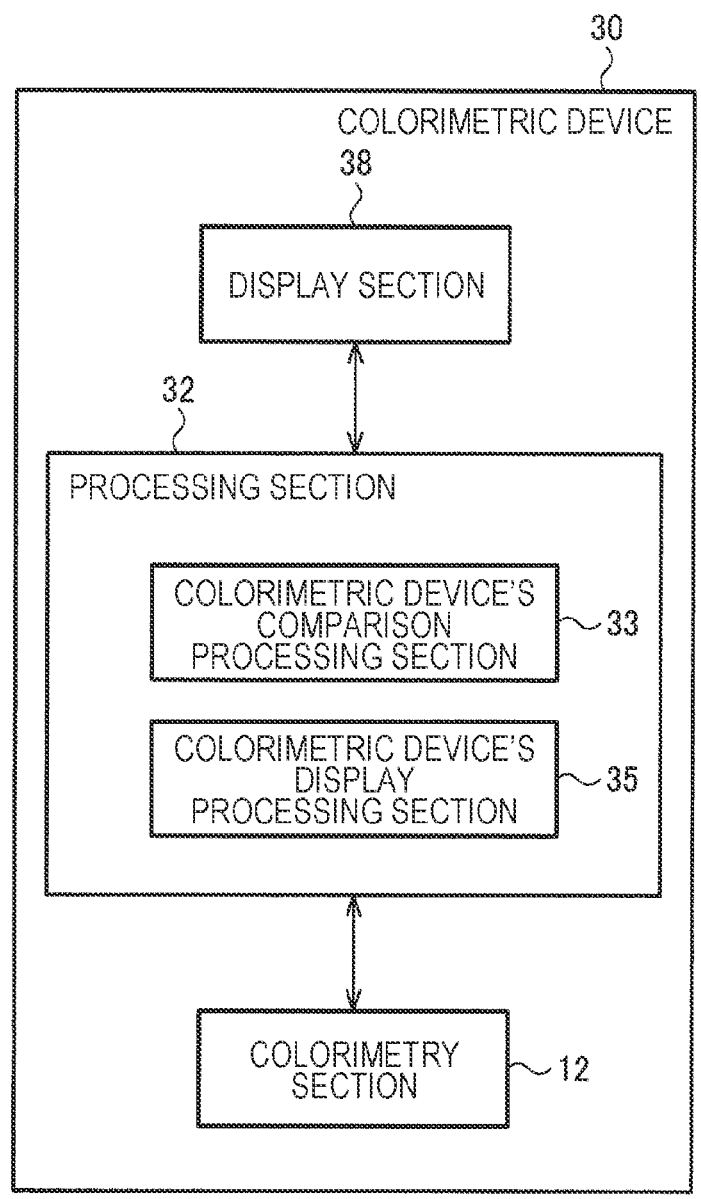
FIG. 5 is a block diagram illustrating an example of the structure of a colorimetric device.

The technique in this embodiment may also be implemented as the colorimetric device 30. FIG. 5 is a block diagram illustrating an example of the structure of the colorimetric device 30 that implements the technique in this embodiment. The colorimetric device 30 includes the colorimetry section 12 and processing section 32. The processing section 32 includes a colorimetric device's comparison processing section 33 and the colorimetric device's display processing section 35 described above. The colorimetric device 30 can also include the display section 38.

The processing section 32 performs control processing for individual sections in the colorimetric device 30 and processing in this embodiment. For example, the processing section 32 performs control processing for the colorimetry section 12 and processing for acquiring colorimetric data from the colorimetry section 12. The processing section 32 also performs input processing for accepting information about a manipulation performed by the user, the information being entered from a manipulation section (not illustrated), processing for reading information from a memory (not illustrated), and processing information to the memory. The processing section 32 also performs processing for displaying information on the display section 38, processing for controlling communication by the communication section 39, and other processing. The processing section 32 can be implemented by a processor. For example, processing in this embodiment can be implemented by a processor that operates according to information such as a program and a memory that stores the information such as a program. The processor may be such that the functions of its individual sections are implemented by individual hardware or that the functions of the individual sections are implemented by integrated hardware. For example, the processor includes hardware. The hardware can include at least one of circuits that process digital signals and circuits that process analog signals. For example, the processor can also be structured with one or a plurality of circuit devices mounted on a circuit board or with one or a plurality of circuit elements. The processor may be a central processing unit (CPU). However, the processor is not limited to a CPU. As the processor, any of various other processors including graphic processing units (GPUs) and digital signal processors (DSPs) can be used. Alternatively, the processor may be a hardware circuit implemented as an application-specific integrated circuit (ASIC). The processor may include an amplifier circuit, a filter circuit, and the like that process analog signals.

Figure 6:
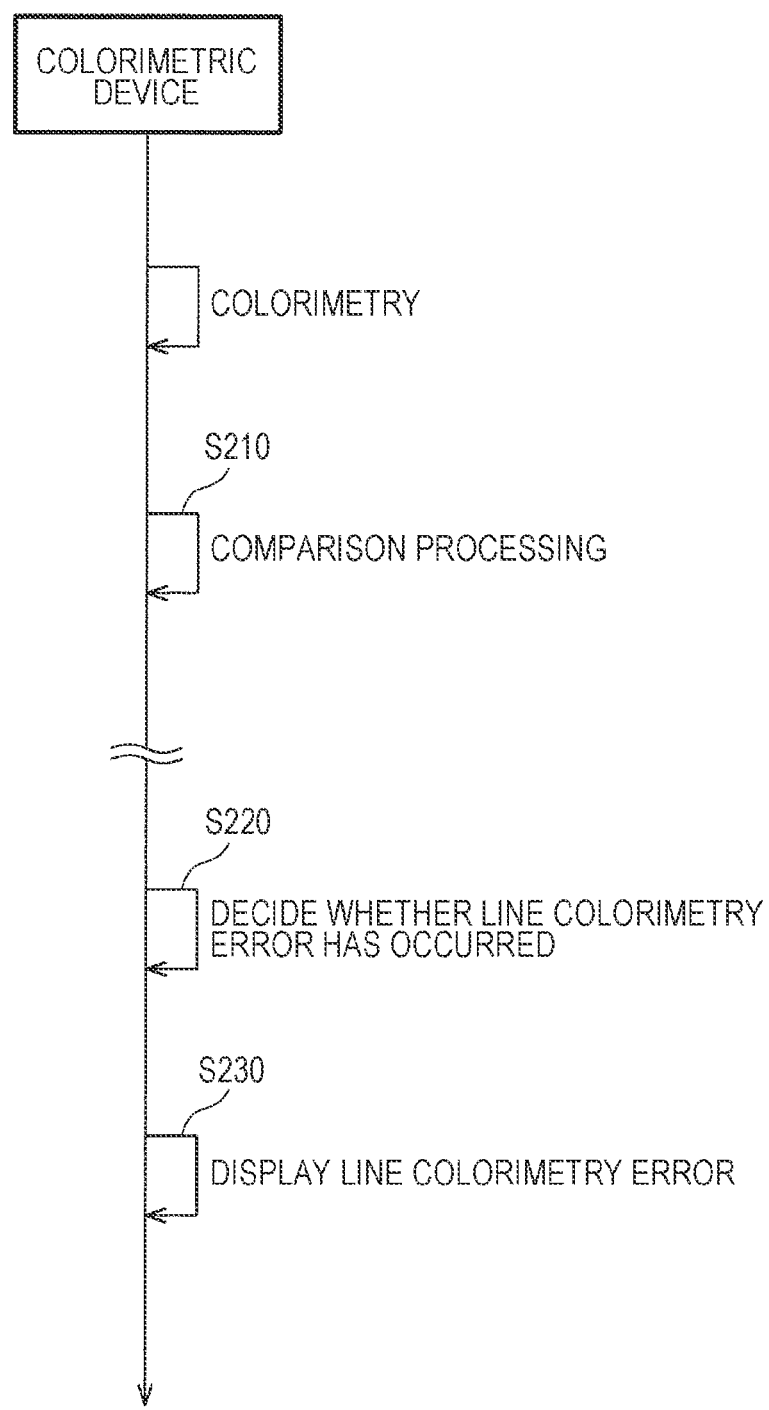
FIG. 6 illustrates a flow of processing in the colorimetric device.

FIG. 6 illustrates a flow of processing when the technique in this embodiment is implemented as the colorimetric device 30. In the colorimetric device 30, the colorimetry section 12 performs colorimetry and the colorimetric device's comparison processing section 33 performs comparison processing (step S210) for comparing the color value of a color for which colorimetry has been performed with the color value of the reference color. The colorimetric device's comparison processing section 33 repeatedly performs comparison processing (step S210) as many times as the number of colors included in one line, after which the processing section 32 decides whether a line colorimetry error has occurred (step S220). When the processing section 32 decides that a line colorimetry error has occurred, the colorimetric device's display processing section 35 displays the line colorimetry error (step S230). Specifically, processing in step S230 may be to turn on a predetermined lamp on as described above or to give the display described above with reference to FIG. 4 on the display section 38. As described above, the colorimetric device 30 in this embodiment includes the colorimetric device's display processing section 35 and the colorimetric device's comparison processing section 33 that performs comparison processing between the color value of the reference color and the color value of the color for which colorimetry has been performed by the colorimetry section 12 that performs colorimetry. The colorimetric device's comparison processing section 33 decides whether a line colorimetry error has occurred on the line under colorimetry. When the colorimetric device's comparison processing section 33 decides that a line colorimetry error has occurred, the colorimetric device's display processing section 35 performs processing for displaying information about the line colorimetry error. Thus, the user can recognize the occurrence of a line colorimetry error while the user performs colorimetry by using the colorimetric device 30. This enables the user to recognize the occurrence of a line colorimetry error at earlier time.

Figure 7:
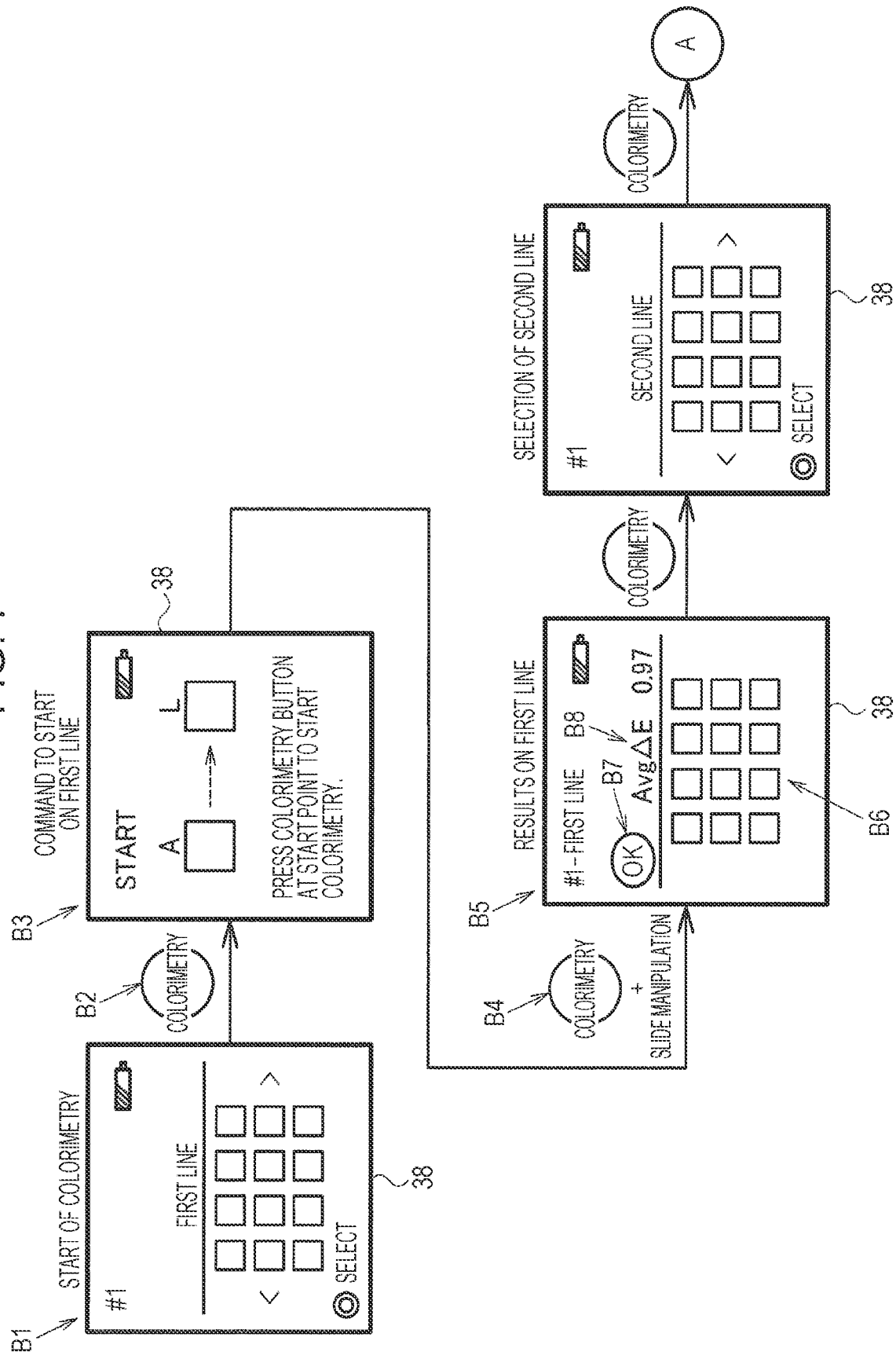
FIG. 7 is a drawing illustrating an example in which screens displayed on the colorimetric device are changed in line colorimetry.
Figure 11:
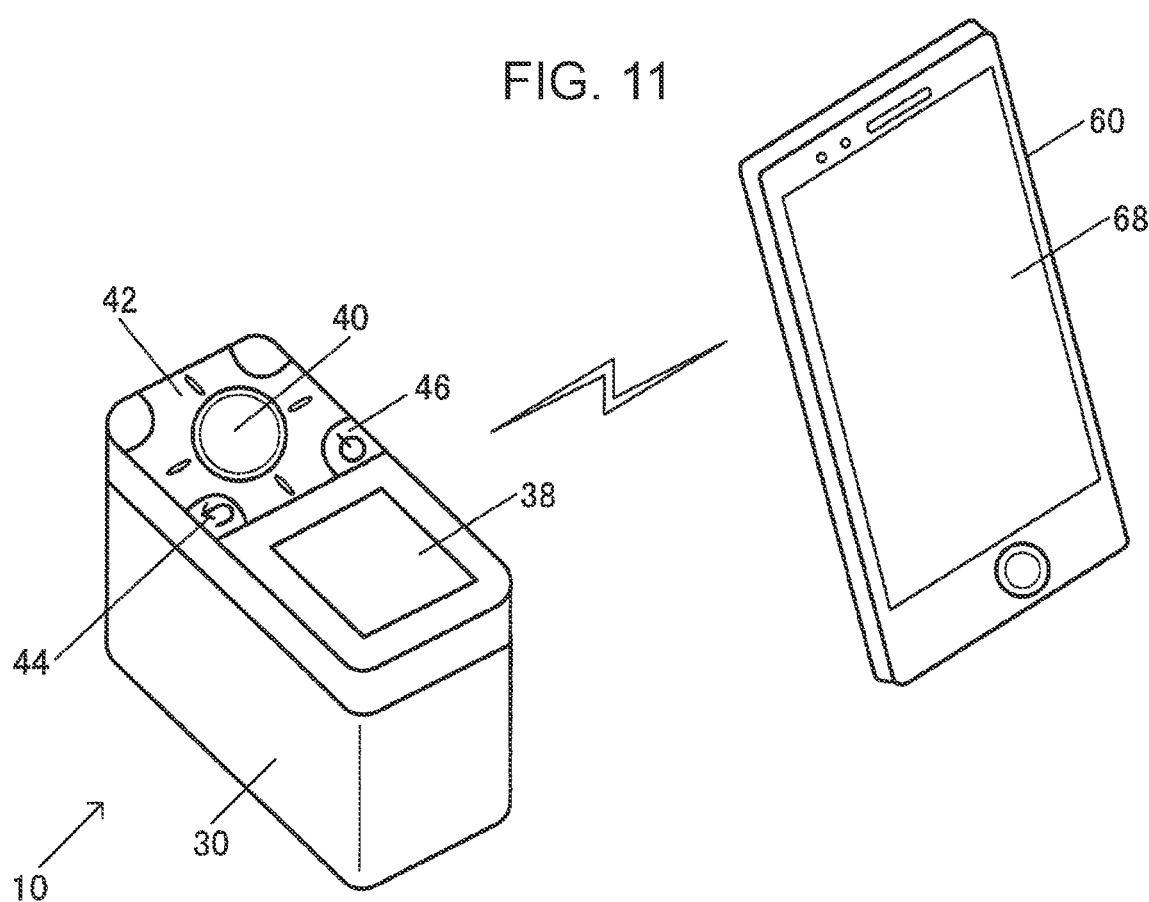
FIG. 11 is a drawing illustrating examples of the outside shapes of the colorimetric device and a terminal apparatus.

Although not illustrated in FIG. 6, after the colorimetric device's comparison processing section 33 has repeatedly performed comparison processing (step S210) as many times as the number of colors included in one line, for example, the colorimetric device's display processing section 35 can also perform processing for updating the display on the display section 38. This enables the user to know the results of the line colorimetry at early time. Specifically, when the user manipulates the colorimetric device 30, the screen displayed on the display section 38 changes, as illustrated in, for example, the example in FIGS. 7, 8, and 9. When a colorimetry button 40 indicated by B2, the colorimetry button 40 being described later with reference to FIG. 11, is pressed in a state in which a start screen to start line colorimetry is displayed on the display section 38 as indicated B1 in FIG. 7, a start commanding screen that commands colorimetry on the first line is displayed as indicated by B3. In this example, a guide indicating manipulations to be performed for line colorimetry is displayed for the user. When the user manipulates the colorimetry button 40 and performs a slide manipulation as indicated by B4, line colorimetry is performed for the first line, after which a result screen for the first line, as indicated by B5, is displayed. When, for example, the user presses the colorimetry button 40 at the start point on the first line and slides the colorimetric device 30 along the first line, which is the target for colorimetry, colorimetry is performed for the first line. In this case, after the user presses the colorimetry button 40 at the start point on the first line and then slides the colorimetric device 30, the user may press the colorimetry button 40 again at the end point on the first line. Alternatively, the user may slide the colorimetric device 30 from the start point on the first line while pressing the colorimetry button 40 and may release the finger that has been pressing the colorimetry button 40 from the colorimetry button 40 at the end point on the first line.

The result screen indicated by B5 displays colors, each of which indicates an outline of the result for the relevant color for which line colorimetry has been performed, as indicated by B6. In this example, the number of colors in the color group on one line is 12, so colors, each of which indicates an outline of the relevant color of the 12 colors in the color group, are displayed. The screen indicated by B5 also displays the decision result, indicated by B7, of line colorimetry on the first line, an average color difference Ave ΔE, indicated by B8, which is the average value of the color differences ΔE on the first line, and the like. The average color difference Ave ΔE may be represented as the average color difference Avg ΔE.

Figure 8:
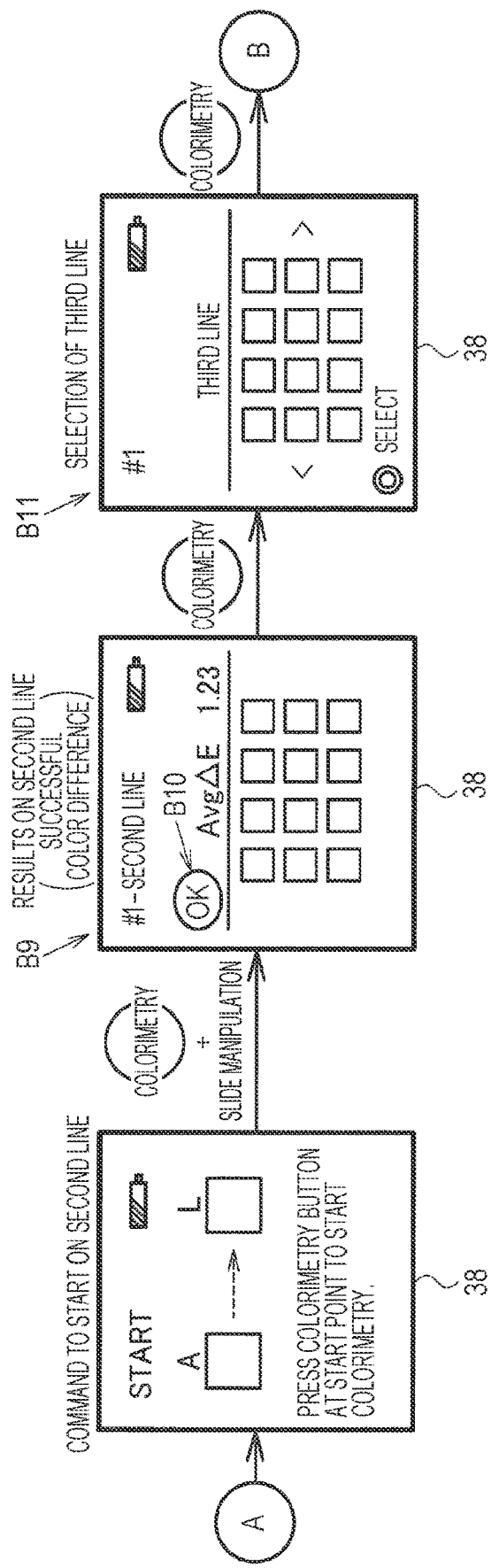
FIG. 8 is another drawing illustrating the example in which screens displayed on the colorimetric device are changed in line colorimetry.
Figure 9:
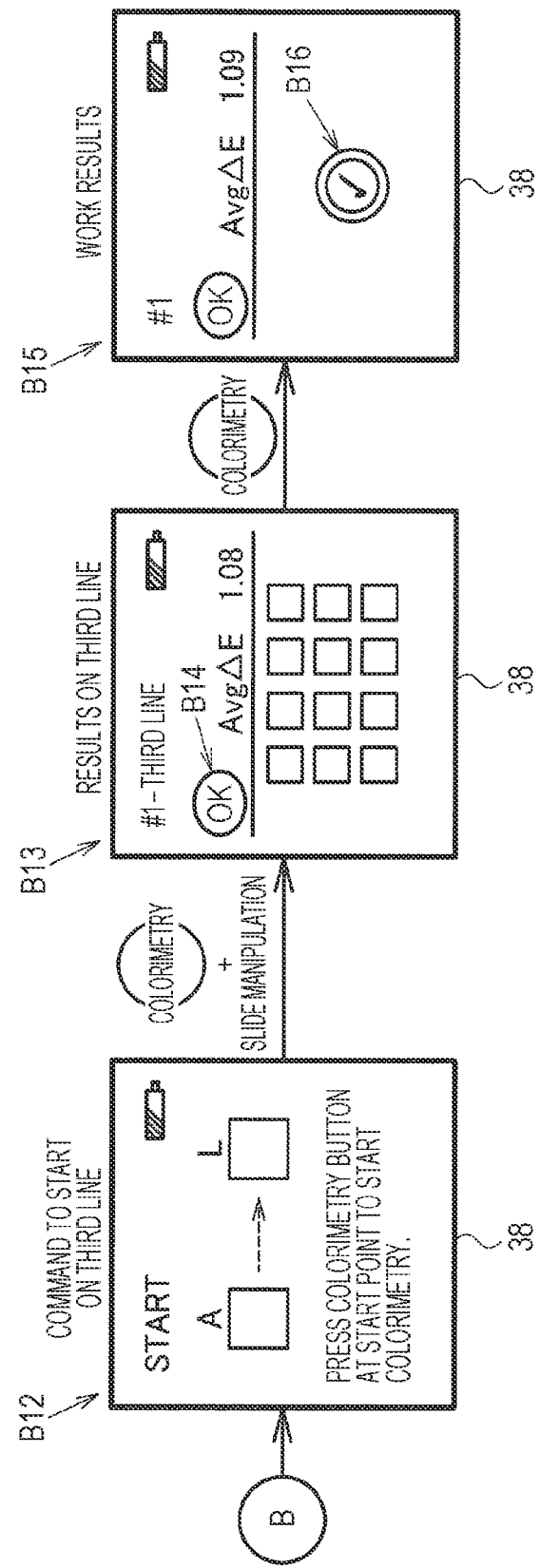
FIG. 9 is yet another drawing illustrating the example in which screens displayed on the colorimetric device are changed in line colorimetry.

FIGS. 8 and 9 illustrate examples in which screens are changed when the decision result for the color differences ΔE is OK on the second and subsequent lines. The display on the screen indicated by B9 in FIG. 8 indicates that the decision result for the average color difference ΔE is OK on the second line, as indicated by B10. In this case, when the colorimetry button 40 is pressed, colorimetry is performed on the third line, as indicated by B11 in FIG. 8 and B12 in FIG. 9. The display on the screen indicated by B13 in FIG. 9 indicates that the decision result for the color differences ΔE is OK on the third line, as indicated by B14. Thus, on a work result screen indicated by B15, a marker indicating the completion of the work is displayed, as indicated by B16.

An example in which information about line colorimetry error and like is displayed on, for example, the display section 38 of the colorimetric device 30 has been described above. However, the technique in this embodiment is not limited to the example. The colorimetric system 10 may be structured so that the display related to line colorimetry error, the display having been described above with reference to FIG. 4, is displayed on a device other than the colorimetric device 30. Specifically, an example of the structure of the colorimetric system 10 in this embodiment may be, for example, as in the block diagram in FIG. 10. A device other than the colorimetric device 30 is, for example, the terminal apparatus 60, but may be another external device.

Figure 10:
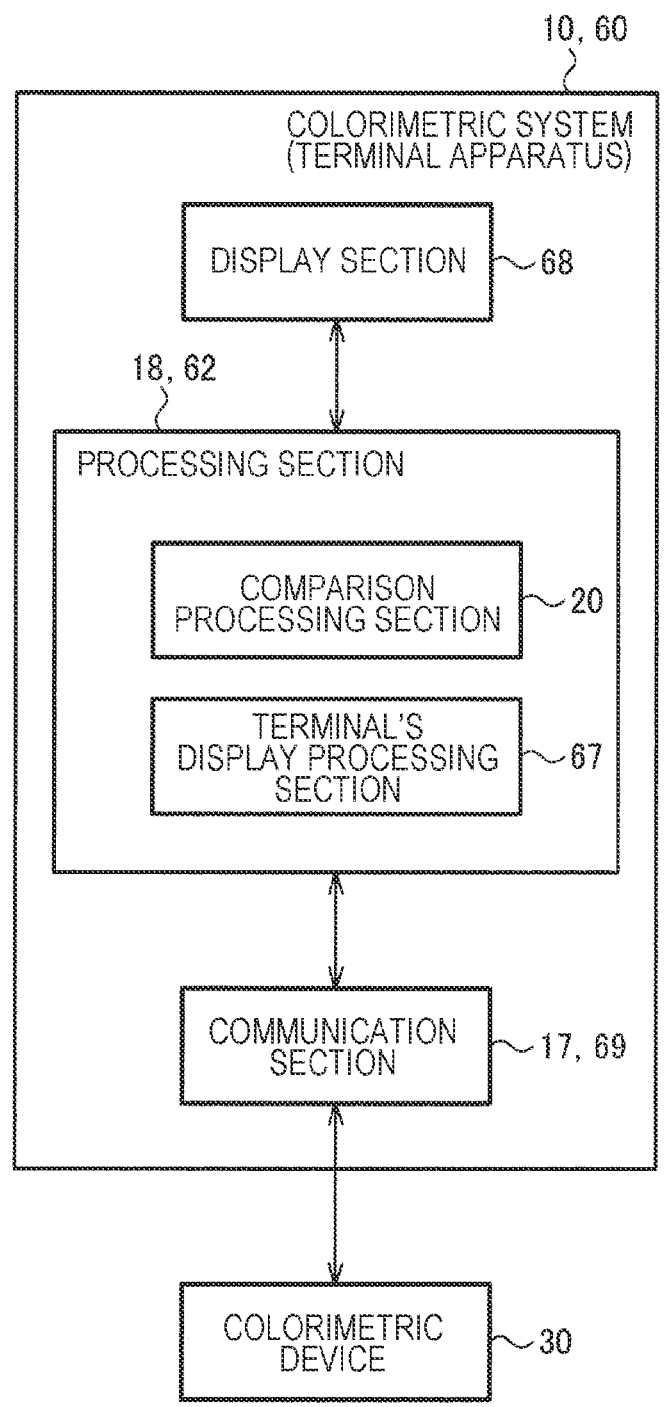
FIG. 10 is a block diagram illustrating yet another example of the structure of the colorimetric system.

In the example of the structure in FIG. 10, it will be assumed that the colorimetric system 10 corresponds to the terminal apparatus 60. The terminal apparatus 60 in FIG. 10 includes the processing section 62 and the communication section 69 that can communicate with the colorimetric device 30. The processing section 62 corresponds to the processing section 18 in FIG. 1, and the communication section 69 corresponds to the communication section 17 in FIG. 1. The processing section 62 includes a terminal's display processing section 67 and the comparison processing section 20 described above with reference to FIG. 1. The colorimetric system 10 can include a display section 68. The terminal's display processing section 67 performs processing for displaying information about a line colorimetry error on the display section 68 in correlation to, for example, information about the line, under colorimetry, on which the line colorimetry error has occurred, details of which will be described later with reference to FIG. 18. The display section 68 will be described later with reference to FIG. 13. That is, the colorimetric system 10 in this embodiment includes the terminal's display processing section 67 that performs processing for displaying information about a line colorimetry error in correlation to information about the line, under colorimetry, on which the line colorimetry error has occurred. Thus, information about a line colorimetry error can be displayed on the terminal apparatus 60 in which comparison processing is in progress between the reference color and the color for which colorimetry has been performed. This enables information about a line colorimetry error to be displayed on the terminal apparatus 60 in more detail. Furthermore, the user of the colorimetric device 30 can be notified of the occurrence of the line colorimetry error. When the colorimetric system 10 is structured as illustrated in FIG. 10, the user can be notified of a line colorimetry error when, for example, a lamp on the colorimetric device 30 is turned on or the colorimetric device 30 outputs an alarm sound. In addition, on the display section 68 of the terminal apparatus 60, a use case in which a more detailed display is provided can be achieved.

Figure 12:
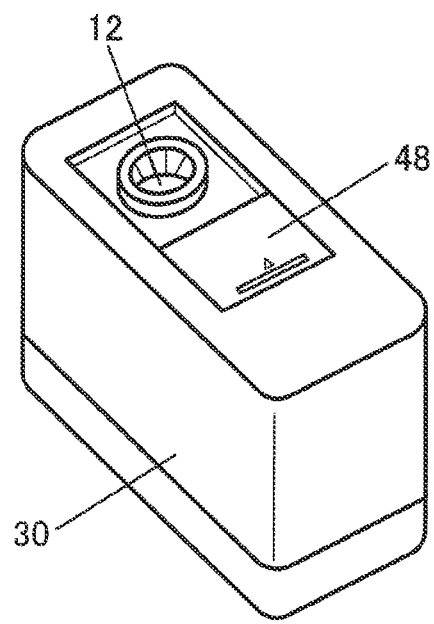
FIG. 12 is another drawing illustrating the example of the outside shape of the colorimetric device.

The technique in this embodiment is not limited to the above. For example, the colorimetric system 10 may include the terminal apparatus 60 including the display section 68 as well as the colorimetric device 30 including the display section 38. FIG. 11 illustrates examples of the outside shapes of the colorimetric device 30 and terminal apparatus 60, which implement the colorimetric system 10. FIG. 12 illustrates the example of the outside shape of the colorimetric device 30. The colorimetric device 30 has, for example, a substantially cubic shape, as illustrated in FIG. 11. The display section 38, the colorimetry button 40, and a cross-shaped key 42 are provided on the upper surface of the colorimetric device 30. A return button 44 and a power button 46 are also provided on the upper surface of the colorimetric device 30. The colorimetry section 12 and a shutter 48 are provided on the lower surface of the colorimetric device 30, as illustrated in FIG. 12. The display section 38 is implemented by, for example, a liquid crystal display or an organic electroluminescent (EL) display. The display section 38 displays various types of information for the user. The colorimetry button 40 is a manipulation device with which the user commands the colorimetric device 30 to perform colorimetry. When, for example, the user presses the colorimetry button 40, the colorimetric device 30 performs colorimetry based on the colorimetry section 12. The cross-shaped key 42 is a manipulation device that commands, for example, upward, downward, left, and right directions. The return button 44 is used to perform a return manipulation, which is also called a back manipulation. The power button 46 turns on and off the power of the colorimetric device 30. The colorimetry section 12 is implemented by a colorimetry sensor as described above. The colorimetry section 12 has a substantially circular shape in plan view. The shutter 48 protects the colorimetry section 12 when the colorimetric device 30 is not in use. When, for example, the user does not use the colorimetric device 30, the user moves the shutter 48 toward the colorimetry section 12 to perform a manipulation to close the shutter 48. This prevents an external shock or the like from being applied to the colorimetry section 12.

The colorimetric device 30 illustrated in FIGS. 11 and 12 are shaped so that the user can hold the colorimetric device 30 and can perform a work operation in colorimetry with one hand. For example, the user uses the thumb and the middle finger, ring finger, and/or little finger to hold side surfaces of the colorimetric device 30, and then uses the index finger to press the colorimetry button 40 or manipulate the cross-shaped key 42 to indicate a direction. The colorimetric device 30 in FIGS. 11 and 12 is just illustrative. The colorimetric device 30 may have another shape.

The terminal apparatus 60 is a communication terminal that can be coupled to the colorimetric device 30 so as to communicate with it. The terminal apparatus 60 is implemented by, for example, a smartphone or a tablet personal computer (PC). The terminal apparatus 60 is coupled to the colorimetric device 30 so as to communicate with it through wireless communication compatible with, for example, Bluetooth or Wi-Fi (registered trademark). The terminal apparatus 60 has the display section 68 and also has manipulation devices such as manipulation buttons. The display section 68 is, for example, a touch panel. The user can perform various manipulations by touching the display section 68, which is a touch panel.

FIG. 13 is a block diagram illustrating an example of the structure of the colorimetric system 10 including the colorimetric device 30 and terminal apparatus 60. The colorimetric system 10 including the colorimetric device 30 and terminal apparatus 60 is not limited to the structure in FIG. 13. The colorimetric system 10 can be practiced as any of various variations by, for example, eliminating some of its constituent elements and adding other constituent elements.

The colorimetric device 30 includes the colorimetry section 12, the processing section 32, a manipulation section 34, a storage section 36, the display section 38, and the communication section 39. The processing section 32 includes the colorimetric device's display processing section 35. The colorimetry section 12 is implemented by a colorimetry sensor as described above. The processing section 32 is as described above with reference to FIG. 5, so its description will be omitted. The description of the communication section 39 will also be omitted because it is similar to the communication section 17 in FIG. 1.

The manipulation section 34 is a manipulation interface that accepts information about a manipulation performed by the user. The manipulation section 34 can be implemented by manipulation devices. When FIG. 11 is taken as an example, the manipulation section 34 can be implemented by the colorimetry button 40, cross-shaped key 42, return button 44, power button 46, and other manipulation devices. However, the manipulation devices that implement the manipulation section 34 are not limited these manipulation devices.

The storage section 36 stores various types of information. For example, the storage section 36 stores a program and data. The storage section 36 functions as a work area for, for example, the processing section 32 and communication section 39. The storage section 36, which is a memory, may be, for example, a static random access memory (SRAM), a dynamic random access memory (DRAM), or other semiconductor memory. Alternatively, the storage section 36 may be a register, a hard disk drive, or the like. For example, the storage section 36, which is a memory, stores a computer-readable instruction. When the instruction is executed by the processing section 32, which is a processor, processing by the processing section 32 is implemented. The instruction referred to here may be an instruction set that constitutes a program or may be an instruction that commands a hardware circuit in the processor to operate.

The display section 38 displays various types of information for the user. The display section 38 is implemented by, for example, a liquid crystal display or an organic EL display, or any of various other displays. The display section 38 displays, for example, information needed for the user to manipulate the colorimetric device 30 and various types of status information about the colorimetric device 30.

The terminal apparatus 60 includes the processing section 62, a manipulation section 64, a storage section 66, the display section 68, and a communication section 69. The processing section 62 includes the comparison processing section 20 and terminal's display processing section 67 described above. The description of the communication section 69 will be omitted because it is similar to the communication section 17 in FIG. 1.

The processing section 62 performs control processing for individual sections in the terminal apparatus 60 and processing in this embodiment. For example, the processing section 62 performs input processing for accepting information about a manipulation performed by the user, the manipulation being entered from the manipulation section 64, processing for reading out information from the storage section 66, and processing for writing information to the storage section 66. The processing section 62 also performs processing for displaying information on the display section 68, processing for controlling communication by the communication section 69, and other processing. The processing section 62 can be implemented by the processor described above or the like.

The manipulation section 64 is a manipulation interface that accepts information about a manipulation performed by the user. The manipulation section 64 can be implemented by manipulation devices. When FIG. 11 is taken as an example, the manipulation section 64 can be implemented by the touch panel of the display section 68, buttons provided on the terminal apparatus 60, and other manipulation devices. However, the manipulation devices that implement the manipulation section 64 are not limited these manipulation devices.

The storage section 66 stores various types of information. For example, the storage section 66 stores a program and data. The storage section 66 functions as a work area for, for example, the processing section 62 and communication section 69. The storage section 66, which is a memory, may be, for example, an SRAM, a DRAM, or other semiconductor memory. Alternatively, the storage section 66 may be a register, a hard disk drive, or an optical disk device. For example, the storage section 66, which is a memory, stores a computer-readable instruction. When the instruction is executed by the processing section 62, which is a processor, processing by the processing section 62 is implemented.

The display section 68 displays various types of information for the user. The display section 68 is implemented by, for example, a liquid crystal display or an organic EL display, or any of various other displays. The display section 68 is implemented by, for example, a touch panel, so the display section 68 also functions as the manipulation section 64. The display section 68 displays, for example, information needed for the user to manipulate the terminal apparatus 60 and various types of status information about the terminal apparatus 60 and colorimetric device 30.

Processing by the colorimetric system 10 in FIG. 13 is implemented by the processing section 62 in the terminal apparatus 60. In this case, the processing section 62 includes the processing section 18 and comparison processing section 20 in FIG. 1 and performs processing by these sections. For example, the program in this embodiment is installed in the terminal apparatus 60 as an application program and is then stored in the storage section 66. This application program executes processing by the processing section 18 and comparison processing section 20. Processing for colorimetry and processing for providing a display on the display section 38, which are part of processing by the colorimetric system 10, are implemented by the processing section 32 in the colorimetric device 30. In this case, the program stored in the storage section 36 executes processing by the colorimetric device 30.

In the colorimetric device 30 described above with reference to FIG. 5, the processing section 32 includes the colorimetric device's comparison processing section 33. However, the colorimetric system 10 may be structured by including the comparison processing section 20 in the processing section 62 in the terminal apparatus 60, instead of including the colorimetric device's comparison processing section 33 in the colorimetric device 30, as in, for example, the structural example in FIG. 13. Thus, it is possible to adapt to a predetermined use case. The predetermined use case is, for example, a case in which the target for colorimetry is a color chart including a vast number of colors and thereby makes it difficult to store all data of the colors in the color chart in the storage section 36 in the colorimetric device 30. In this structure, the comparison processing section 20 in the terminal apparatus 60 performs comparison processing (step S110), and when a line colorimetry error occurs, transmits information about the line colorimetry error to the colorimetric device 30 (step S130), enabling the image described above with reference to FIG. 4 or another image to be displayed on the display section 38. The user can recognize the line colorimetry error from the image at early time.

Next, exemplary screens, displayed on the terminal apparatus 60, for group colorimetry in line colorimetry will be described with reference to FIGS. 14, 15, 16, 17, and 18. When the user activates a predetermined application program in the terminal apparatus 60, the processing section 62 displays the screen indicated by D1 in FIG. 14 on the display section 68. When, for example, the user selects any of the colorimetry icon, comparison icon, history icon, and color sample icon, which are indicated by A1, on the screen indicated by D1, a shift occurs to a colorimetry result screen, a color comparison screen, a history screen for colors for which colorimetry was performed in the past, or a selection screen for a color sample chart accordingly. An icon or the like on the display section 68 can be selected by touching the display section 68, which is a touch panel. On the screen indicated by D1, the user has yet to select a manipulation for colorimetry, so no colorimetry result is displayed as indicated by A2. When the user is to perform a manipulation for colorimetry, the user performs a manipulation to select the icon of the colorimetry button indicated by A3. Alternatively, the user may press the colorimetry button 40 on the colorimetric device 30. Status information such as the remaining amount in the battery in the colorimetric device 30 is displayed on the screen as indicated by A4.

When the user selects the button icon indicated by A5, a shift occurs from the screen indicated by D1 to the screen indicated by D2. On the screen indicated by D2, each of the color groups created by the user is displayed as a bar icon. For the bar icon of each group, the name of the color group, the date of the creation of the color group, and a predetermined thumbnail image may be displayed so as to be overlaid. This enables the user to quickly select a color group.

Figure 15:
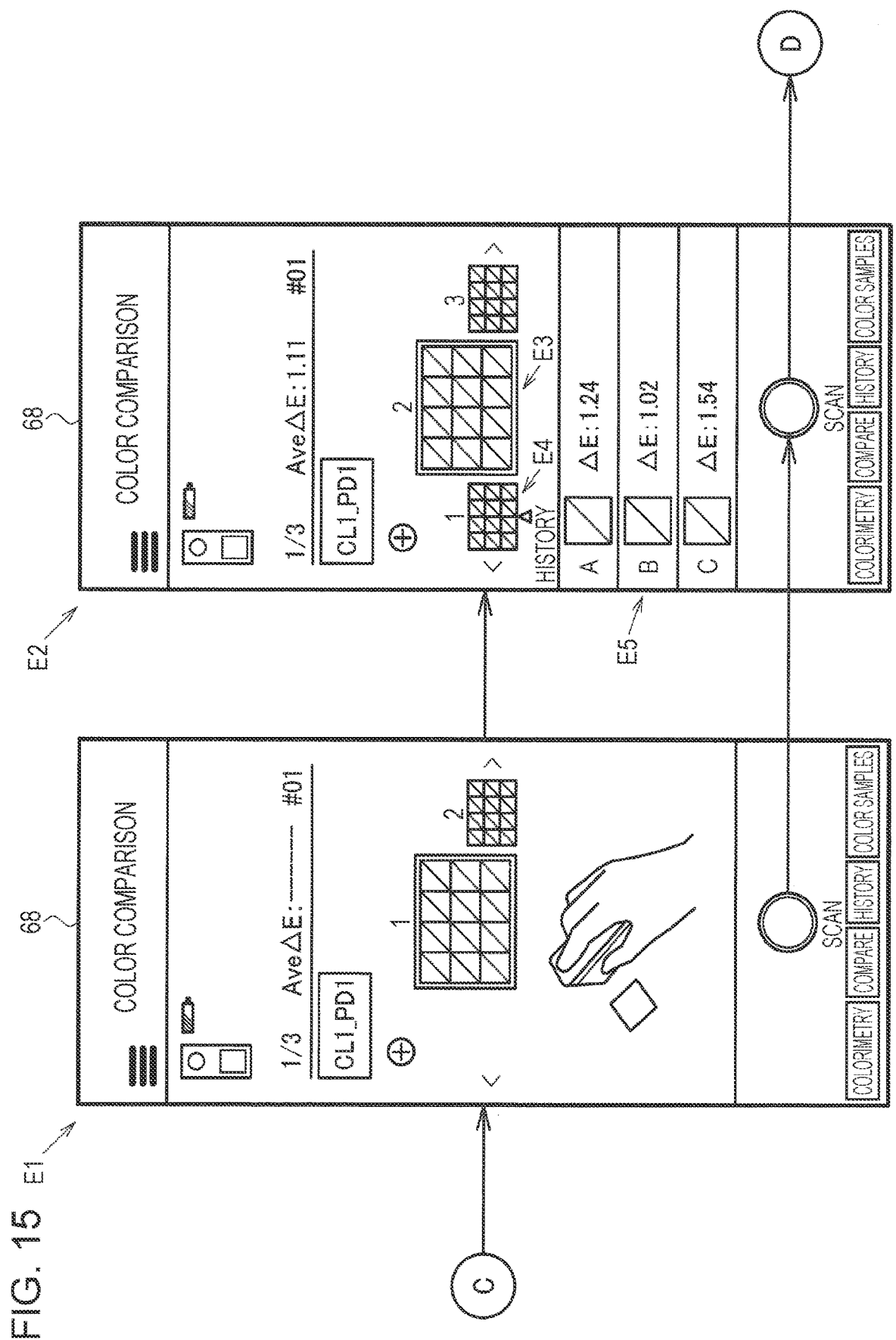
FIG. 15 illustrates another example in which screens displayed on terminal apparatus are changed in line colorimetry.

When the user selects a color group with, for example, the color group name CL1_PD1 on the screen indicated by D2, a shift occurs from the screen indicated by D2 to the screen indicated by E1 in FIG. 15. The name CL1_PD1 of the selected color group may be displayed on the screen indicated by E1. Thus, during colorimetry, the user can recognize the color group for which colorimetry is in progress. After the screen indicated by E1 is displayed on the display section 68, colorimetry is performed first for the first line. A screen as indicated by E2 is then displayed on the display section 68 as the result of the colorimetry. On the screen indicated by E2, a first marker in a rectangular shape and colors, each of which indicates an outline of the relevant color on a next line for which to perform colorimetry, are displayed as indicated by E3; the first marker identifies the colors on the next line for which to perform colorimetry. A second marker in a triangular arrow shape and colors, each of which indicates an outline of the relevant color for which colorimetry was performed this time, are displayed as indicated by E4; the second marker identifies the colors on the line for which colorimetry was performed this time. For each of the colors for which colorimetry was performed, a display is given as indicated by E5.

Figure 16:
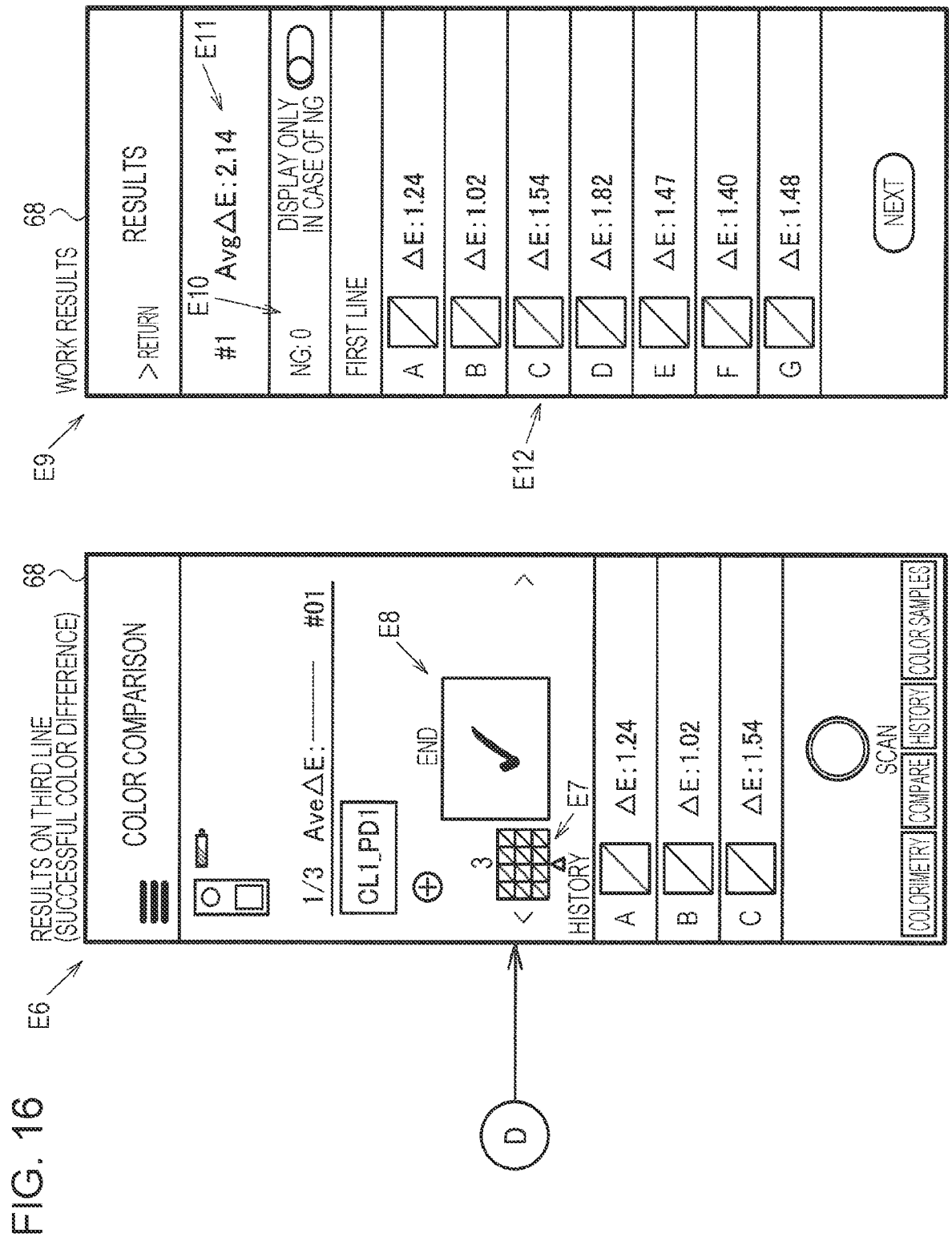
FIG. 16 illustrates yet another example in which screens displayed on terminal apparatus are changed in line colorimetry.

When colorimetry is performed for the third line through similar work, a screen as indicated by E6 in FIG. 16 is displayed on the display section 68. On the screen indicated by E6, it is indicated that colorimetry has been performed for colors on the third line, which is the last line, as indicated by E7. A display indicating that there is no next color group for which to perform colorimetry is given as indicated by E8. At a predetermined timing after that, a shift occurs from the screen indicated by E6 to a screen, as indicated by E9, that indicates work results. The predetermined timing is, for example, the user's selection of a predetermined icon or the elapse of a predetermined time. On the screen indicated by E9, a display indicating that the number of NG results is 0 is given as indicated by E10, and the average color difference Ave $\Delta E$ for, for example, all lines is displayed as indicated by E11. The color difference $\Delta E$ and a color indicating an outline are also displayed for each color on each line, as indicated by E12.

The colorimetry result for each line is indicated as a square group. In the square group, square images, each of which is equally divided into two areas by a single diagonal line, are arranged according to a predetermined rule. The predetermined rule referred to here is, for example, that 12 square images arranged so that three images are aligned vertically and four images are aligned horizontally. Before colorimetry, although not illustrated in detail, the square group is displayed so that one of the divided areas is filled in with a reference color. After colorimetry, the square group is displayed so that the other area is filled in with the color for which colorimetry has been performed. On the screen indicated by E1, for example, the square groups related to colorimetry results for the first and second lines are displayed so that one of the divided areas is filled in with the reference color because both lines have yet to undergo colorimetry.

Similarly, on the screen indicated by E2, the square group related to colorimetry results for the first line is displayed so that one of the divided areas is filled in with the reference color and the other areas is filled in with the color for which colorimetry has been performed because the line has undergone colorimetry, as indicated by E4. The square groups related to colorimetry results for the second and third lines are displayed so that one of the divided areas is filled in with the reference color because both lines have yet to undergo colorimetry. Similarly, on the screen indicated by E6, the square group related to colorimetry results for the third line is displayed so that one of the divided areas is filled in with the reference color and the other areas is filled in with the color for which colorimetry has been performed because the line has undergone colorimetry.

Now, the reference color included in the line one line above the line eligible for colorimetry this time will be referred to as a first reference color, and the reference color included in the line one line below the line eligible for colorimetry this time will be referred to as a second reference color. Then, on the screen indicated by E2, for example, both the first reference color and the second reference color are displayed. On the screen indicated by E1, for example, the first reference color is not displayed but the second reference color is displayed. Similarly, although not illustrated, when colorimetry is performed for the last line, the first reference color is displayed but the second reference color is not displayed. That is, at least one of the first reference color and second reference color is displayed on the screen of the display section 68 of the terminal apparatus 60.

Figure 14:
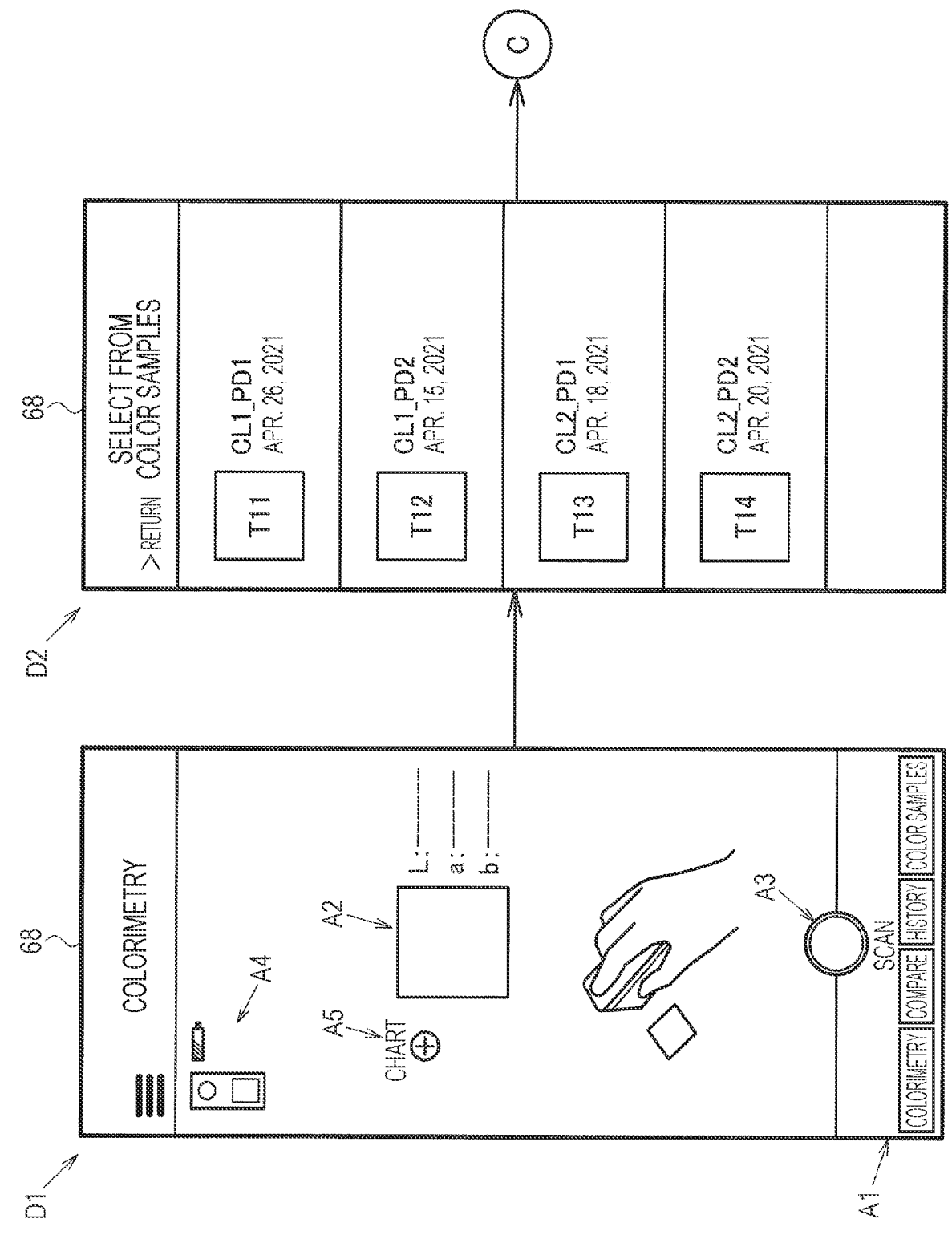
FIG. 14 illustrates an example in which screens displayed on terminal apparatus are changed in line colorimetry.

FIGS. 14 to 16 illustrate examples of screens and example of screen transition when the number of NG results is 0. However, a predetermined error may be included. Situations including a predetermined error occur when the line for which colorimetry has been performed is correct but any of the colorimetry results for the colors is an NG result as illustrated in, for example FIG. 17, and when a colorimetry error occurs because the line for which colorimetry has been performed is not correct as illustrated in FIG. 18.

Figure 17:
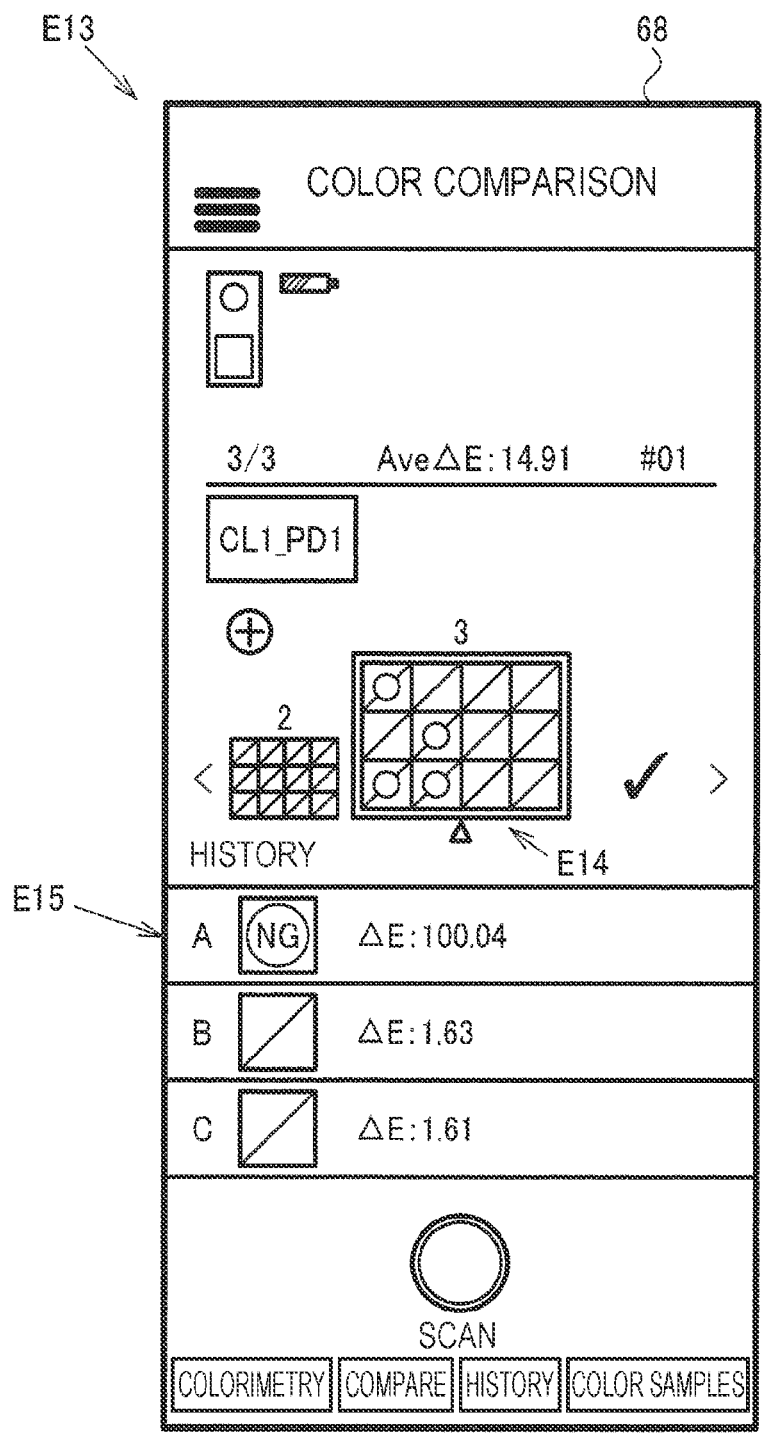
FIG. 17 illustrates an example of a screen, on the terminal apparatus, showing a colorimetry result in line colorimetry.
Figure 20:
FIG. 20 illustrates specific examples of a first criterion and a second criterion.

The display on the screen indicated by E13 in FIG. 17 indicates that, for example, the third line for which the user performed colorimetry was correct but four colors caused NG results on the third line as indicated by E14. A thumbnail image, by which an NG result can be recognized, is displayed for each color for which colorimetry was performed and that caused an NG result in colorimetry, as illustrated by E15. The comparison processing section 20 decides whether the color for which colorimetry was performed caused an NG result by deciding whether the first criterion is satisfied. The intent of the first criterion is to decide whether the color difference ΔE, which is the difference between the received color value and the color value of the reference color, is less than or equal to a predetermined tolerance value. Specifically, when the color difference ΔE, which is the difference between the received color value and the color value of the reference color, exceeds the predetermined tolerance value, the comparison processing section 20 decides an NG result for the color for which colorimetry was performed. The predetermined tolerance value is, for example, a first tolerance color difference P1 ΔE, which will be described later with reference to FIG. 20. The user can appropriately set the predetermined tolerance value. The comparison processing section 20 also decides whether the line for which colorimetry was performed is correct by deciding whether a second criterion is satisfied. The second criterion, which will be described later in detail with reference to FIG. 20, is different from the first criterion. The exemplary screen in FIG. 17 indicates that the second criterion is satisfied. As described above, in the colorimetric system 10 in this embodiment, when the comparison processing section 20 decides that no line colorimetry error is present on the line under colorimetry, the terminal's display processing section 67 displays a result based on the first criterion for each color included in the line under colorimetry. This enables the user to more clearly recognize that the line for which colorimetry was performed is correct.

Figure 18:
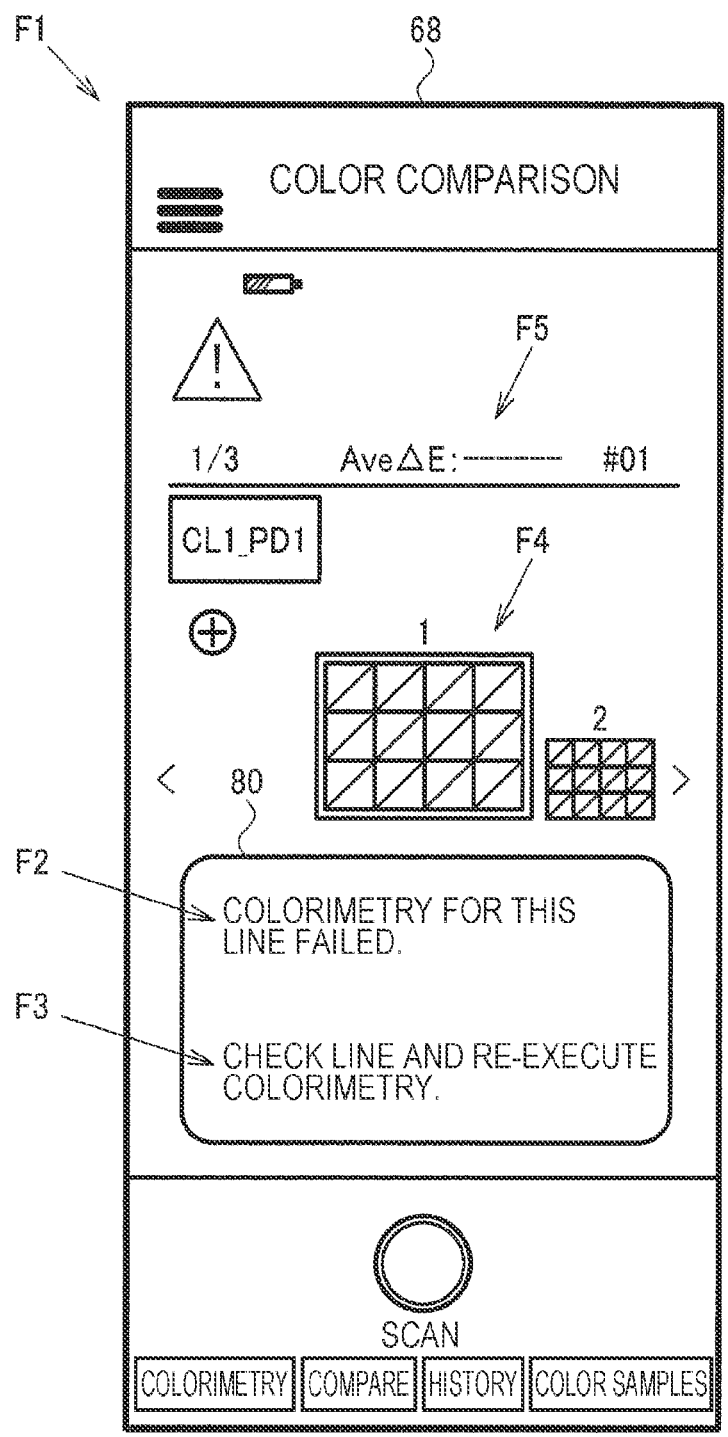
FIG. 18 illustrates an example of another screen, on the terminal apparatus, showing a colorimetry result in line colorimetry.

The exemplary screen indicated by F1 in FIG. 18 indicates that, for example, the user intended to perform colorimetry for the first line but has performed colorimetry for the wrong line, so a line colorimetry error is displayed. In other words, the exemplary screen indicated by F1 in FIG. 18 is a screen displayed when that the second criterion described above is not satisfied. Thus, in the colorimetric system 10 in this embodiment, the comparison processing section 20 makes a decision for each color included in the line under colorimetry according to the first criterion, and also makes a decision for the line under colorimetry according to the second criterion different from the first criterion. When the line under colorimetry fails to satisfy the second criterion, the comparison processing section 20 decides that a line colorimetry error has occurred. This enables the user to distinguish between a line colorimetry error and a colorimetry error for each color included in the line under colorimetry.

Specifically, in case of a line colorimetry error, a line colorimetry error display 80, for example, is displayed so as to be overlaid on the screen indicated by E1 in FIG. 15 or the like. The line colorimetry error display 80 is not overlaid on the square groups described above. Therefore, the user can recognize the reference color indicated for the square group related to the line for which to perform colorimetry this time as well as the first reference color or second reference color described above. Specifically, in the colorimetric system 10 in this embodiment, the terminal's display processing section 67 performs processing for displaying at least one of a first reference color group on the line one line above the line under colorimetry, the line including a line colorimetry error, and a second reference color group on the line one line below the line under colorimetry. This enables the user to know the line on which a line colorimetry error has occurred as well as information about the reference color related to lines before and after the line.

The line colorimetry error display 80 includes a display indicating unsuccessful colorimetry as indicated by, for example, F2. Thus, the user can recognize that a line colorimetry error has occurred on, for example, the first line of the color chart. The line colorimetry error display 80 also includes a display prompting re-execution of colorimetry for the first line as indicated by, for example, F3. That is, in the colorimetric system 10 in this embodiment, the terminal's display processing section 67 performs processing for prompting re-execution of colorimetry for the line under colorimetry on which a line colorimetry error has occurred.

This enables the user to recognize that the user has made a mistake in selecting a line for which to perform colorimetry.

As for the line colorimetry error, the terminal's display processing section 67 does not a display indicating whether there is an NG result for each color, as indicated by F4. As for the line colorimetry error again, the terminal's display processing section 67 also does not display a display indicating the average color difference Ave ΔE, as indicated by F5. That is, in the colorimetric system 10 in this embodiment, when the comparison processing section 20 decides that a line colorimetry error has occurred on the line under colorimetry, the terminal's display processing section 67 performs processing not for displaying a result based on the first criterion for each color included in the line under colorimetry. This enables the user to more clearly recognize that a line colorimetry error has occurred.

Figure 19:
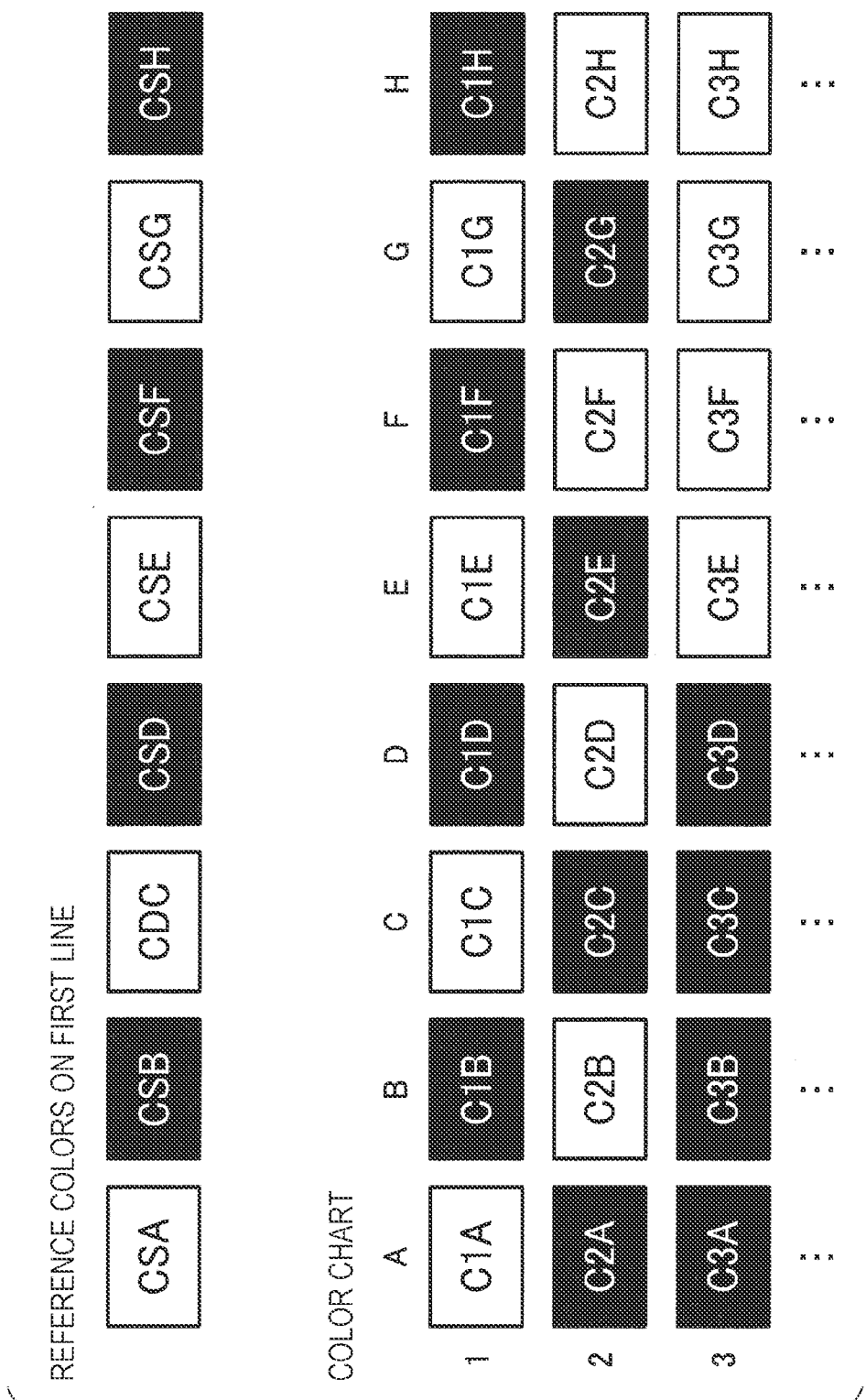
FIG. 19 illustrates specific examples of a color group and a color chart.

Next, the first criterion and second criterion will be described in more detail with reference to FIGS. 19 and 20. FIG. 19 illustrates a specific example of a color group composed of reference colors as well as a specific example of a color chart. The color chart in FIG. 19 is a test pattern in which lines are aligned vertically and eight colors are aligned horizontally on each line. The user can identify lines placed vertically in the color chart with numerals, and can also identify the position of each of the colors placed horizontally on each line with a letter. Specifically, color C1A, color C1B, color C1C, color C1D, color C1E, color C1F, color C1G, and color C1H are arranged on the first line in the color chart. Similarly, color C2A, color C2B, color C2C, color C2D, color C2E, color C2F, color C2G, and color C2H are arranged on the second line in the color chart; and color C3A, color C3B, color C3C, color C3D, color C3E, color C3F, color C3G, and color C3H are arranged on the third line. The comparison processing section 20 compares the color value of each color on the first line with the color value of the relevant color in the color group composed of reference colors, and decides whether the first criterion is satisfied. Specifically, the comparison processing section 20 makes a comparison between color CSA and color C1A, between color CSB and color C1B, between color CSC and color C1C, between color CSD and color C1D, between color CSE and color C1E, between color CSF and color C1F, between color CSG and color C1G, and between color CSH and color C1H.

FIG. 20 illustrates an example of colorimetry results in line colorimetry in which the color group composed of the reference colors in FIG. 19 was used for the first, second, and third lines in the color chart in FIG. 19. Specifically, the colorimetry results for the second line are colorimetry results in colorimetry performed by the user for the second line, which is wrong. More specifically, the colorimetry results are results of comparison made by the user between color CSA and color C2A, between color CSB and color C2B, between color CSC and color C2C, between color CSD and color C2D, between color CSE and color C2E, between color CSF and color C2F, between color CSG and color C2G, and between color CSH and color C2H. Similarly, the colorimetry results for the third line are colorimetry results in colorimetry performed by the user for the third line, which is wrong. More specifically, the colorimetry results are results of comparison made by the user between color CSA and color C3A, between color CSB and color C3B, between color CSC and color C3C, between color CSD and color C3D, between color CSE and color C3E, between color CSF and color C3F, between color CSG and color C3G, and between color CSH and color C3H.

Here, as the first criterion, it will be assumed that the color difference ΔE between a color value on a line under colorimetry and the color value of the relevant reference color must be less than or equal to 3.0, which is the first tolerance color difference P1 ΔE. Similarly, as the second criterion, it will be assumed that the average color difference Ave ΔE for the line under colorimetry must be less than or equal to 20.0, which is the second tolerance color difference P2 ΔE. The color difference ΔE between each color on the first line, which is the correct line under colorimetry, and the relevant reference color satisfies the first criterion. However, the color difference ΔE between some colors on the third line, which is the wrong line under colorimetry, and the relevant reference colors does not satisfy the first criterion. Specifically, as illustrated in FIG. 20, the color difference ΔE does not satisfy the first criterion between the color value of color CSA and the color value of color C3A, between the color value of color CSC and the color value of color C3C, between the color value of color CSF and the color value of color C3F, and between the color value of color CSH and the color value of color C3H. The average color difference Ave ΔE for the colors on the third line is 53.0, failing to satisfy the second criterion. Therefore, the comparison processing section 20 decides that the user has performed colorimetry for the wrong line. The first tolerance color difference P1 ΔE and second tolerance color difference P2 ΔE may be equal. The user can appropriately change these differences. Here, however, the second tolerance color difference P2 ΔE is set so as to be greater than the first tolerance color difference P1 ΔE. This is because when the user mistakenly selects a line for which to perform colorimetry, colors between which coloration or the like is extremely different may be compared, in which case the value of the color difference ΔE becomes extremely high. Thus, in the colorimetric system 10 in this embodiment, when the average of the color differences ΔE between the color values of the colors on the line under colorimetry and their relevant reference values exceeds the tolerance color difference, the comparison processing section 20 decides that the second criterion is not satisfied and thereby a line colorimetry error has occurred. Therefore, the criterion according to which whether a line colorimetry error has occurred is decided can be made clear. This enables the user to distinguish between colorimetry results obtained when the line under colorimetry is correct and colorimetry results obtained when the line under colorimetry is wrong.

As for the second criterion, it may be assumed that, for example, the color difference ΔE exceeds the first tolerance color difference P1 ΔE for all colors on the line under colorimetry. For example, for each color on the second line, which is the wrong line under colorimetry, the color difference ΔE between the color and its relevant reference color does not satisfy the first criterion as illustrated in FIG. 20, so it may be assumed that the second criterion is not also satisfied. This is because when the color difference ΔE does not satisfy the first criterion for any of all colors, the probability is high that the line under colorimetry is wrong. As described above, in the colorimetric system 10 in this embodiment, when the color difference ΔE between the color value and its relevant reference value exceeds the tolerance color difference for all colors on the line under colorimetry, the comparison processing section 20 decides that the second criterion is not satisfied and thereby a line colorimetry error has occurred. Thus, it is possible to detect a colorimetry result for which the probability is high that the line under colorimetry is wrong.

Examples of the second criterion is not restricted to the above description; various variations can be practiced. For example, as the second criterion, dispersion and the like may be considered besides the average of color differences ΔE. Alternatively, a plurality of second criterion examples described above may be combined.

As described above, a colorimetric system in this embodiment includes: a communication section that receives the color value of a color for which colorimetry was performed by a colorimetric device that performs colorimetry; and a comparison processing section that performs comparison processing between the received color value and the color value of a reference color. The comparison processing section decides whether a line colorimetry error occurred on a line under colorimetry. When the comparison processing section decides that the line colorimetry error occurred, the communication section transmits information about the line colorimetry error to the colorimetric device.

Thus, it is possible to notify the user at earlier time that colorimetry is in progress for the wrong line. Therefore, the amount of work needed to perform colorimetry again can be minimized, enabling the user to smoothly perform colorimetry.

The colorimetric system may also include a terminal's display processing section that performs processing for displaying information about the line colorimetry error in correlation to information about the line under colorimetry, the line including the line colorimetry error.

Thus, information about the line colorimetry error can be displayed on a terminal apparatus in which comparison processing is in progress between the reference color and the color for which colorimetry was performed.

The terminal's display processing section may perform processing for displaying a prompt to re-execute colorimetry for the line under colorimetry, the line including the line colorimetry error.

Thus, the user can recognize that the wrong line was selected as the target for colorimetry.

The terminal's display processing section may also perform processing for displaying at least one of a first reference color group on the line one line above the line under colorimetry, the line including the line colorimetry error, and a second reference color group on the line one line below the line under colorimetry.

Thus, the user can know the line on which the line colorimetry error occurred as well as information about the reference color related to lines before and after the line.

The colorimetric system may also include the colorimetric device. The colorimetric device may include a colorimetric device's display processing section that performs processing for displaying information about the line colorimetry error.

Thus, it is possible to display information about the line colorimetry error on the display section of the colorimetric device.

The colorimetric device's display processing section may perform processing for displaying a prompt to re-execute colorimetry for the line under colorimetry, the line including the line colorimetry error.

Thus, the user can reliably recognize that the wrong line was selected as the target for colorimetry.

The comparison processing section may make a decision for each color included in the line under colorimetry according to a first criterion, and may also make a decision for the line under colorimetry according to a second criterion different from the first criterion. When the line under colorimetry fails to satisfy the second criterion, the comparison processing section may decide that a line colorimetry error occurred.

Therefore, the user can distinguish between the line colorimetry error and a colorimetry error for each color included in the line under colorimetry.

When the comparison processing section decides that a line colorimetry error occurred on the line under colorimetry, the terminal's display processing section may not display a result based on the first criterion for each color included in the line under colorimetry.

Thus, the user can more clearly recognize that a line colorimetry error occurred.

When the comparison processing section decides that no line colorimetry error is present on the line under colorimetry, the terminal's display processing section may display a result based on the first criterion for each color included in the line under colorimetry.

Thus, the user can more clearly recognize that the line for which colorimetry was performed is correct.

When the color difference between the color value and a reference value corresponding to the color value exceeds a tolerance color difference for all colors on the line under colorimetry, the comparison processing section may decide that the second criterion is not satisfied and thereby a line colorimetry error occurred.

Thus, it is possible to detect a colorimetry result for which the probability is high that the line under colorimetry is wrong.

When the average of color differences, each of which is between the color value of each color on the line under colorimetry and the reference value corresponding to the color value, exceeds a tolerance color difference, the comparison processing section decides that the second criterion is not satisfied and thereby a line colorimetry error occurred.

Thus, the criterion according to which whether a line colorimetry error occurred is decided can be made clear.

A colorimetric device in this embodiment includes: a comparison processing section that performs comparison processing between the color value of a reference color and the color value of a color for which colorimetry was performed by a colorimetry section that performs colorimetry; and a display processing section. The comparison processing section decides whether a line colorimetry error occurred on a line under colorimetry. When the comparison processing section decides that a line colorimetry error occurred, the display processing section performs processing for displaying information about the line colorimetry error.

Thus, the user can recognize the occurrence of a line colorimetry error while the user performs colorimetry by using the colorimetric device. This enables the user to recognize the occurrence of a line colorimetry error at earlier time.

A colorimetric method in this method comprises: receiving the color value of a color for which colorimetry was performed by a colorimetric device that performs colorimetry; performing comparison processing between the received color value and the color value of a reference color; deciding whether a line colorimetry error occurred on a line under colorimetry; and transmitting, when the occurrence of a line colorimetry error is decided, information about the line colorimetry error to the colorimetric device.

A non-transitory computer-readable storage medium in this embodiment stores a program that causes a terminal apparatus to execute: a step of receiving the color value of a color for which colorimetry was performed by a colorimetric device that performs colorimetry; and a step of performing comparison processing between the received color value and the color value of a reference color.

Furthermore, the program in this embodiment causes a colorimetric system to execute: a step of deciding whether a line colorimetry error occurred on a line under colorimetry; and a step of transmitting, when the occurrence of a line colorimetry error is decided, information about the line colorimetry error to the colorimetric device.

So far, this embodiment has been described above in detail. However, it will be understood by those skilled in the art that many variations are possible without substantively departing from the novel items and effects in this embodiment. Therefore, these variations are all included in the range of the present disclosure. For example, when a term is described at least once in the description or the drawings together with a different term that has a broader sense than the term or is synonymous with the term, the term can be replaced with the different term at any portions in the description or the drawings. All combinations of this embodiment and its variations are also included in the range of the present disclosure. Various variations can also be practiced for the structures, operations, and the like of the colorimetric system, colorimetric device, colorimetric method, program, and the like, without being limited to those described in this embodiment.

What is claimed is:

1. A colorimetric system comprising:
   a communication processor that receives a color value of a color for which colorimetry was performed by a colorimetric device that performs colorimetry; and
   a comparison processor that performs comparison processing between the received color value and a color value of a reference color; wherein
   the comparison processor decides that a colorimetry error regarding a colorimetric value has occurred when a first color difference between a first colorimetric value which is the colorimetric value of a first color on a line under colorimetry, and a first reference value which is the reference value of the first color, does not satisfy a first criterion,
   the comparison processor decides that a line colorimetry error which indicates the line under colorimetry is incorrect, has occurred when a value based on the first color difference, and a second color difference between a second colorimetric value which is a colorimetric value of a second color on the line under colorimetry and a second reference value which is the reference value of the second color, does not satisfy a second criterion, and
   when the comparison processor decides that the line colorimetry error occurred, the communication processor transmits information about the line colorimetry error to the colorimetric device.

2. The colorimetric system according to claim 1, further comprising a terminal's display processor that performs processing for displaying information about the line colorimetry error in correlation to information about the line under colorimetry, the line including the line colorimetry error.

3. The colorimetric system according to claim 2, wherein the terminal's display processor performs processing for displaying a prompt to re-execute colorimetry for the line under colorimetry, the line including the line colorimetry error.

4. The colorimetric system according to claim 2, wherein the terminal's display processor performs processing for displaying at least one of a first reference color group on a line one line above the line under colorimetry, the line including the line colorimetry error, and a second reference color group on a line one line below the line under colorimetry.

5. The colorimetric system according to claim 1, further comprising the colorimetric device, wherein the colorimetric device includes a colorimetric device's display processor that performs processing for displaying information about the line colorimetry error.

6. The colorimetric system according to claim 5, wherein the colorimetric device's display processor performs processing for displaying a prompt to re-execute colorimetry for the line under colorimetry, the line including the line colorimetry error.

7. The colorimetric system according to claim 2, wherein when the comparison processor decides that the line colorimetry error occurred on the line under colorimetry, the terminal's display processor does not display a result of the colorimetry error for each color included in the line under colorimetry.

8. The colorimetric system according to claim 2, wherein when the comparison processor decides that the line colorimetry error is not present on the line under colorimetry, the terminal's display processor displays a result of the colorimetry error for each color included in the line under colorimetry.

9. The colorimetric system according to claim 1, wherein when each of the color difference between the each colorimetric value and the each reference value corresponding to the colorimetric value exceeds a tolerance color difference for all colors on the line under colorimetry, the comparison processor decides that the second criterion is not satisfied and thereby the line colorimetry error occurred.

10. The colorimetric system according to claim 1, wherein when an average of color differences, each of which is between the colorimetric value of each color on the line under colorimetry and the reference value corresponding to the color value, exceeds a tolerance color difference, the comparison processor decides that the second criterion is not satisfied and thereby the line colorimetry error occurred.

11. A colorimetric device comprising:
    a colorimetric device's comparison processor that performs comparison processing between a color value of a reference color and a color value of a color for which colorimetry was performed by a colorimetry section that performs colorimetry; and
    a colorimetric device's display processor, wherein
    the colorimetric device's comparison processor decides that a colorimetry error regarding a colorimetric value has occurred when a first color difference between a first colorimetric value which is the colorimetric value of a first color on a line under colorimetry, and a first reference value which is the reference value of the first color, does not satisfy a first criterion,
    the colorimetric device's comparison processor decides that a line colorimetry error which indicates the line under colorimetry is incorrect has occurred when a value based on the first color difference, and a second color difference between a second colorimetric value which is a colorimetric value of a second color on the line under colorimetry and a second reference value which is the reference value of the second color, does not satisfy a second criterion, and
    when the colorimetric device's comparison processor decides that the line colorimetry error occurred, the colorimetric device's display processor performs processing for displaying information about the line colorimetry error.

12. A colorimetric method comprising:

receiving a color value of a color for which colorimetry was performed by a colorimetric device that performs colorimetry;

performing comparison processing between the received color value and a color value of a reference color;

deciding that a colorimetry error regarding a colorimetric value has occurred when a first color difference between a first colorimetric value which is the colorimetric value of a first color on a line under colorimetry, and a first reference value which is the reference value of the first color, does not satisfy a first criterion;

deciding that a line colorimetry error, which indicates the line under colorimetry is incorrect has occurred when a value based on the first color difference, and a second color difference between a second colorimetric value which is a colorimetric value of a second color on the line under colorimetry and a second reference value which is the reference value of the second color, does not satisfy a second criterion; and transmitting, when an occurrence of the line colorimetry error is decided, information about the line colorimetry error to the colorimetric device.

13. A non-transitory computer-readable storage medium storing a program that causes a colorimetric system to execute:

receiving a color value of a color for which colorimetry was performed by a colorimetric device that performs colorimetry;

performing comparison processing between the received color value and a color value of a reference color;

deciding that a colorimetry error regarding a colorimetric value has occurred when a first color difference between a first colorimetric value which is the colorimetric value of a first color on a line under colorimetry, and a first reference value which is the reference value of the first color, does not satisfy a first criterion;

deciding that a line colorimetry error which indicates the line under colorimetry is incorrect has occurred when a value based on the first color difference, and a second color difference between a second colorimetric value which is a colorimetric value of a second color on the line under colorimetry and a second reference value which is the reference value of the second color, does not satisfy a second criterion; and transmitting, when an occurrence of the line colorimetry error is decided, information about the line colorimetry error to the colorimetric device.

* * * * *